(12) United States Patent
Huang

(10) Patent No.: US 8,711,492 B2
(45) Date of Patent: Apr. 29, 2014

(54) MONOFOCAL PHOTOGRAPHING LENS ASSEMBLY

(71) Applicant: Largan Precision Co., Ltd., Taichung (TW)

(72) Inventor: Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 13 days.

(21) Appl. No.: 13/684,168

(22) Filed: Nov. 22, 2012

(65) Prior Publication Data

US 2014/0063626 A1   Mar. 6, 2014

(30) Foreign Application Priority Data

Sep. 4, 2012   (TW) ............................. 101132175 A

(51) Int. Cl.
*G02B 3/02* (2006.01)

(52) U.S. Cl.
USPC ........................................ 359/714

(58) Field of Classification Search
USPC ........................................ 359/714
See application file for complete search history.

(56) References Cited

U.S. PATENT DOCUMENTS 7,502,181 B2 * 3/2009 Shinohara ..................... 359/764

\* cited by examiner

*Primary Examiner* — James Jones
(74) *Attorney, Agent, or Firm* — CKC & Partners Co., Ltd.

(57) ABSTRACT

A monofocal photographing lens assembly includes, in order from an object side to an image side, a first lens element, a second lens element, a third lens element, a fourth lens element, a fifth lens element and a sixth lens element. The first lens element with negative refractive power has a concave image-side surface. The second lens element has refractive power. The third lens element has refractive power. The fourth lens element has refractive power. The fifth lens element has negative refractive power. The sixth lens element with positive refractive power has a convex image-side surface.

25 Claims, 16 Drawing Sheets

MONOFOCAL PHOTOGRAPHING LENS ASSEMBLY

RELATED APPLICATIONS

The application claims priority to Taiwan Application Serial Number 101132175, filed on Sep. 4, 2012, which is herein incorporated by reference.

BACKGROUND

1. Technical Field

The present invention relates to a monofocal photographing lens assembly. More particularly, the present invention relates to a compact monofocal photographing lens assembly applicable to electronic products.

2. Description of Related Art

In recent years, the applications of an optical lens system are getting wider, especially in vehicle image system, image security system, internet video, mobile device, and compact camera. The image sensor of a conventional optical lens system is typically a CCD (Charge-Coupled Device) sensor or a CMOS (Complementary Metal-Oxide Semiconductor) sensor. As the advanced semiconductor manufacturing technologies have allowed the pixel size of the sensors to be reduced and compact optical lens system have gradually evolved toward the field of higher megapixels, there is an increasing demand for optical lens system featuring better image quality.

A conventional optical lens system with a large field of view mainly adopts lens element with negative refractive power near an object side, and adopts lens elements with positive refractive power near an image side, thus an inverse telephoto structure is formed for obtaining a larger field of view, such as a four-element optical lens system disclosed in U.S. Pat. No. 7,446,955.

Although other conventional optical lens systems with five-element lens structure such as the ones disclosed in U.S. Pat. No. 8,248,713 enhance image quality and resolving power, these optical designs still reside with unsolved problems. Since the outer diameter of each lens element of the conventional optical lens system has dramatic variation in geometry, it is not favorable for assembling the lens elements so as to decrease manufacturing yield rate, and the difficulty in lens barrel design also increases. As demands on vehicle image system, image security system, and internet video device are increasing, there exits a need on a monofocal photographing lens assembly with large field of view, excellent image quality, simple design, and high manufacturing yield rate.

SUMMARY

According to one aspect of the present disclosure, a monofocal photographing lens assembly includes, in order from an object side to an image side, a first lens element, a second lens element, a third lens element, a fourth lens element, a fifth lens element, and a sixth lens element. The first lens element with negative refractive power has a concave image-side surface. The second lens element has refractive power. The third lens element has refractive power. The fourth lens element has refractive power. The fifth lens element has negative refractive power. The sixth lens element with positive refractive power has a convex image-side surface. When a sum of central thicknesses of the first through sixth lens elements is $\Sigma CT$, an axial distance between an object-side surface of the first lens element and the image-side surface of the sixth lens element is Td, a focal length of the monofocal photographing lens assembly is f, a focal length of the first lens element is f1 and an f-number of the monofocal photographing lens assembly is Fno, the following relationships are satisfied: $1.0 < Td/\Sigma CT < 1.35$; $-1.5 < f/f1 < -0.6$; and $1.5 < Fno < 3.0$.

According to another aspect of the present disclosure, a monofocal photographing lens assembly includes, in order from an object side to an image side, a front lens group, a stop, and a rear lens group. The front lens group includes a first lens element and a second lens element. The first lens element with negative refractive power has concave image-side surface. The second lens element has refractive power. The rear lens group includes a third lens element, a fourth lens element, a fifth lens element, and a sixth lens element. The third lens element with refractive power has a convex image-side surface. The fourth lens element has refractive power. The fifth lens element has negative refractive power. The sixth lens element with positive refractive power has a convex image-side surface. When a sum of central thicknesses of the first through sixth lens elements is $\Sigma CT$, an axial distance between an object-side surface of the first lens element and the image-side surface of the sixth lens element is Td, a focal length of the monofocal photographing lens assembly is f, and a focal length of the first lens element is f1, the following relationships are satisfied: $1.0 < Td/\Sigma CT < 1.35$; and $-1.5 < f/f1 < -0.6$.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
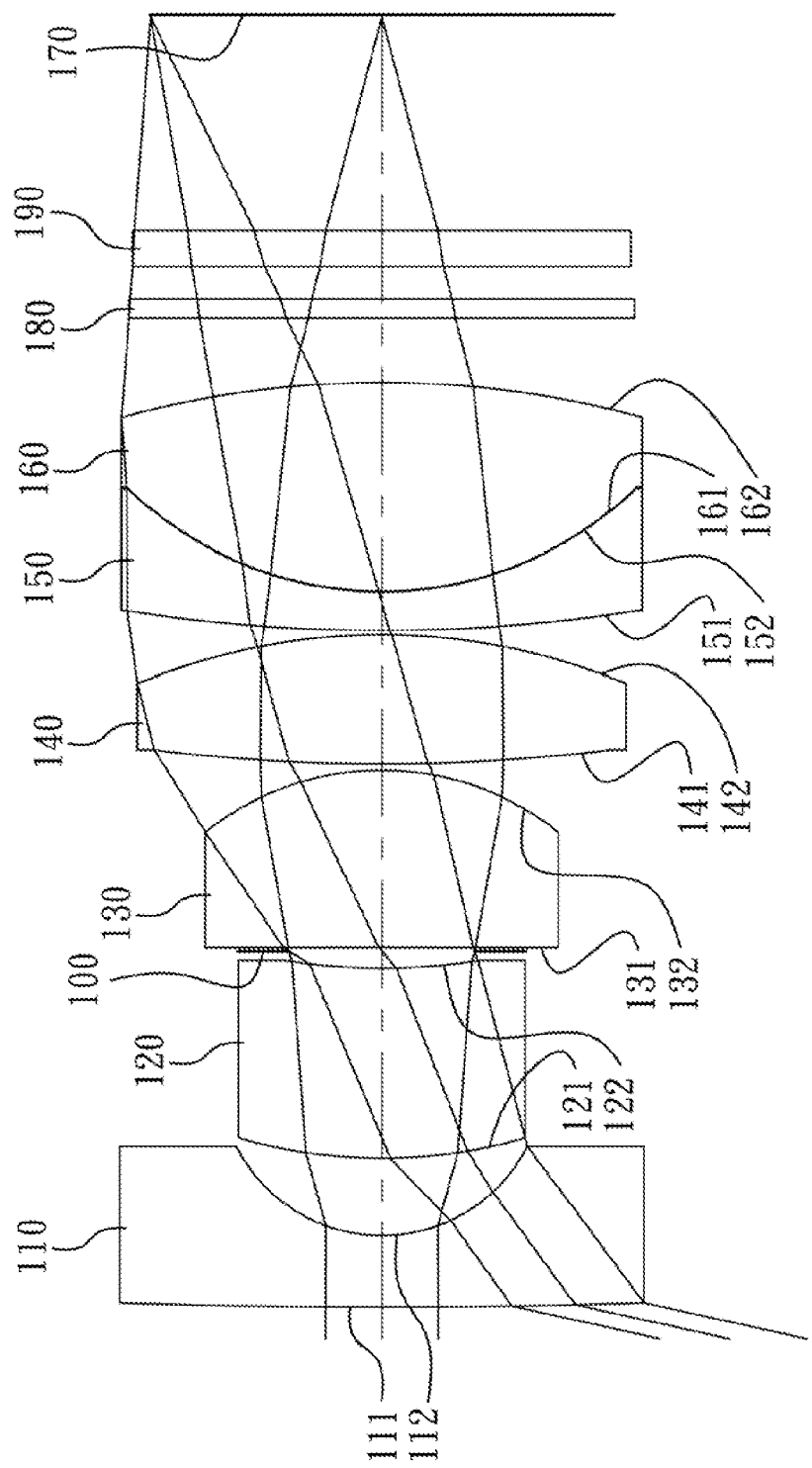
FIG. 1 is a schematic view of a monofocal photographing lens assembly according to the 1st embodiment of the present disclosure.

A monofocal photographing lens assembly is provided. The monofocal photographing lens assembly includes, in order from an object side to an image side, a first lens element, a second lens element, a third lens element, a fourth lens element, a fifth lens element, and a sixth lens element.

Another monofocal photographing lens assembly is provided. The monofocal photographing lens assembly includes, in order from an object side to an image side, a front lens group, a stop, and a rear lens group, wherein the stop can be an aperture stop. The front lens group includes, in order from an object side to an image side, a first lens element, and a second lens element. The rear lens group includes, in order from an object side to an image side, a third lens element, a fourth lens element, a fifth lens element, and a sixth lens element.

The first lens element with negative refractive power has a concave image-side surface, so that the field of view of the monofocal photographing lens assembly can be expanded.

The second lens element can have a convex object-side surface, so that the total track length of the monofocal photographing lens assembly can be reduced.

The third lens element can have positive refractive power, so that the sensitivity of the monofocal photographing lens assembly can be reduced. The third lens element has a convex image-side surface, so that it is favorable for reducing the total track length of the monofocal photographing lens assembly. Furthermore, an air space can be formed between the second lens element and the third lens element, so that it is favorable for assembling the lens elements to enhance the manufacturing yield rate.

The fourth lens element can have a convex object-side surface and a convex image-side surface, so that the spherical aberration of the monofocal photographing lens assembly can be corrected.

The fifth lens element can have negative refractive and a concave image-side surface, so that the high order aberration of the monofocal photographing lens assembly can be corrected. Furthermore, an air space can be formed between the fourth lens element and the fifth lens element, so that it is favorable for assembling the lens elements to enhance the manufacturing yield rate.

The sixth lens element has a convex image-side surface with positive refractive power, and can have a convex object-side surface. Therefore, the distribution of the positive refractive power of the monofocal photographing lens assembly can be balanced. Furthermore, the angle of the incident light to an image sensor can be reduced for better sensor response efficiency, and the image quality can be enhanced. Moreover, the fifth lens element can be cemented with the sixth lens element, so that the chromatic aberration can be corrected.

When a sum of central thicknesses of the first through sixth lens elements is $\Sigma CT$, and an axial distance between an object-side surface of the first lens element and the mage-side surface of the sixth lens element is Td, the following relationship is satisfied $1.0 < Td/\Sigma CT < 1.35$. Therefore, it is favorable for assembling the lens elements by properly adjusting the thicknesses and the distance between each lens element. Moreover, similar geometry of the outer diameter of each lens element is favorable for the design and manufacturing of the barrel. Preferably, $\Sigma CT$ and Td can satisfy the following relationship: $1.0 < Td/\Sigma CT < 1.25$.

When a focal length of the monofocal photographing lens assembly is f, and a focal length of the first lens element is f1 the following relationship is satisfied: $-1.5 < -0.6$. Therefore, a field of view of the monofocal photographing lens assembly can be enlarged by properly adjusting the negative refractive power of the first lens element. Preferably, f and f1 can satisfy the following relationship: $-1.2 < f/f1 < -0.75$.

When an f-number of the monofocal photographing lens assembly is Fno, the following relationship is satisfied: $1.5 < Fno < 3.0$. Therefore, advantages of a large aperture arrangement of the monofocal photographing lens assembly can be obtained. Furthermore, a clear image can be obtained under low light condition with a high speed shutter due to the larger aperture of the monofocal photographing lens assembly. Preferably, Fno can satisfy the following relationship: $1.8 < Fno < 2.5$.

When the focal length of the monofocal photographing lens assembly is f, and a focal length of the second lens element is f2, the following relationship is satisfied: $-0.5 < f/f2 < 0.5$. Therefore, the total track length of the monofocal photographing lens assembly can be reduced by properly adjusting the refractive power of the second lens element. Preferably, f and f2 can satisfy the following relationship: $-0.3 < f/f2 < 0.3$.

When half of a maximal field of view of the monofocal photographing lens assembly is HFOV, the following relationship is satisfied: 70 degrees<HFOV<100 degrees. An excessively large field of view would produce a more pronounced image distortion at the peripheral region thereof; an insufficient field of view would overly constrain the imaging field. Therefore, the proper field of view of the monofocal photographing lens assembly can reduce image distortions so as to improve image quality.

When a relative illumination at an 80% position of a maximal image height on an image plane of the monofocal photographing lens assembly is RI_0.8F, the following relationship is satisfied: 70%<RI_0.8F. Therefore, the sufficient illumination within the imaging range can provide notable improvements in the image quality.

When an effective radius of the object-side surface of the first lens element is SD11, and an effective radius of the image-side surface of the sixth lens element is SD62, the following relationship is satisfied: $0.8 < SD11/SD62 < 1.3$. Therefore, the incident angle of the light can be effectively reduced and the off-axis aberration can be corrected as well.

When an axial distance between the object-side surface of the first lens element and the stop is Dr1s, and an axial distance between the stop and the image-side surface of the sixth lens element is Dsr12 the following relationship is satisfied: $0.4 < Dr1s/Dsr12 < 1.0$. Therefore, a field of view of the monofocal photographing lens assembly can be enlarged by properly adjusting the position of the stop, and thereby increase the viewable range.

When the focal length of the monofocal photographing lens assembly is f, the focal length of the first lens element is f1, the focal length of the second lens element is f2, a focal length of the third lens element is f3, a focal length of the fourth lens element is f4, a focal length of the fifth lens element is f5, and a focal length of the sixth lens element is f6, the following relationships are satisfied: |f/f1|>|f/f2|, |f/f1|>|f/f3|, |f/f1|>|f/f4|, |f/f1|>|f/f5|, and |f/f1|>|f/f6|. Therefore, the field of view of the monofocal photographing lens assembly can be enlarged by the proper refractive power of the first lens element, and thereby increase the viewable range.

When an axial distance between the second lens element and the third lens element is T23, and an axial distance between the fourth lens element and the fifth lens element is T45, the following relationship is satisfied: 0.1 T45/T23<5. Therefore, it is favorable for assembling the lens elements and enhancing the manufacturing yield rate by properly adjusting the distance between each lens element.

When a refractive index of the sixth lens element is N6, the following relationship is satisfied: N6>1.7. Therefore, the distribution of the refractive power of the monofocal photographing lens assembly can be balanced due to the large positive refractive power of the sixth lens element.

According to the monofocal photographing lens assembly of the present disclosure, the lens elements thereof can be made of plastic or glass materials. When the lens elements are made of glass material, the allocation of the refractive power of the monofocal photographing lens assembly may be more flexible and easier to design. When the lens elements are made of plastic material, the manufacturing cost can be effectively reduced. Furthermore, the surface of each lens element can be aspheric, so that it is easier to make the surface into non-spherical shapes. As a result, more controllable variables are obtained for reducing the aberration, and the number of required lens elements for constructing a monofocal photographing lens assembly can be reduced. Therefore, the total track length of the monofocal photographing lens assembly can also be reduced.

According to the monofocal photographing lens assembly of the present disclosure, when a lens element has a convex surface, it indicates that the surface is convex at a paraxial region; and when a lens element has a concave surface, it indicates that the surface is concave at a paraxial region.

According to the monofocal photographing lens assembly of the present disclosure, the monofocal photographing lens assembly can include at least one stop, such as an aperture stop, a glare stop or a field stop. Said glare stop or said field stop is for eliminating the stray light and thereby improving the image resolution thereof.

In the present monofocal photographing lens assembly, an aperture stop can be configured as a front stop or a middle stop. A front stop disposed between an object and the first lens element can provide a longer distance between an exit pupil of the system and an image plane and which improves the image-sensing efficiency of an image sensor. A middle stop disposed between the first lens element and an image plane is favorable for enlarging the field of view of the system and thereby provides a wider field of view for the same.

According to the above description of the present disclosure, the following 1st-8th specific embodiments are provided for further explanation.

1st Embodiment

Figure 2:
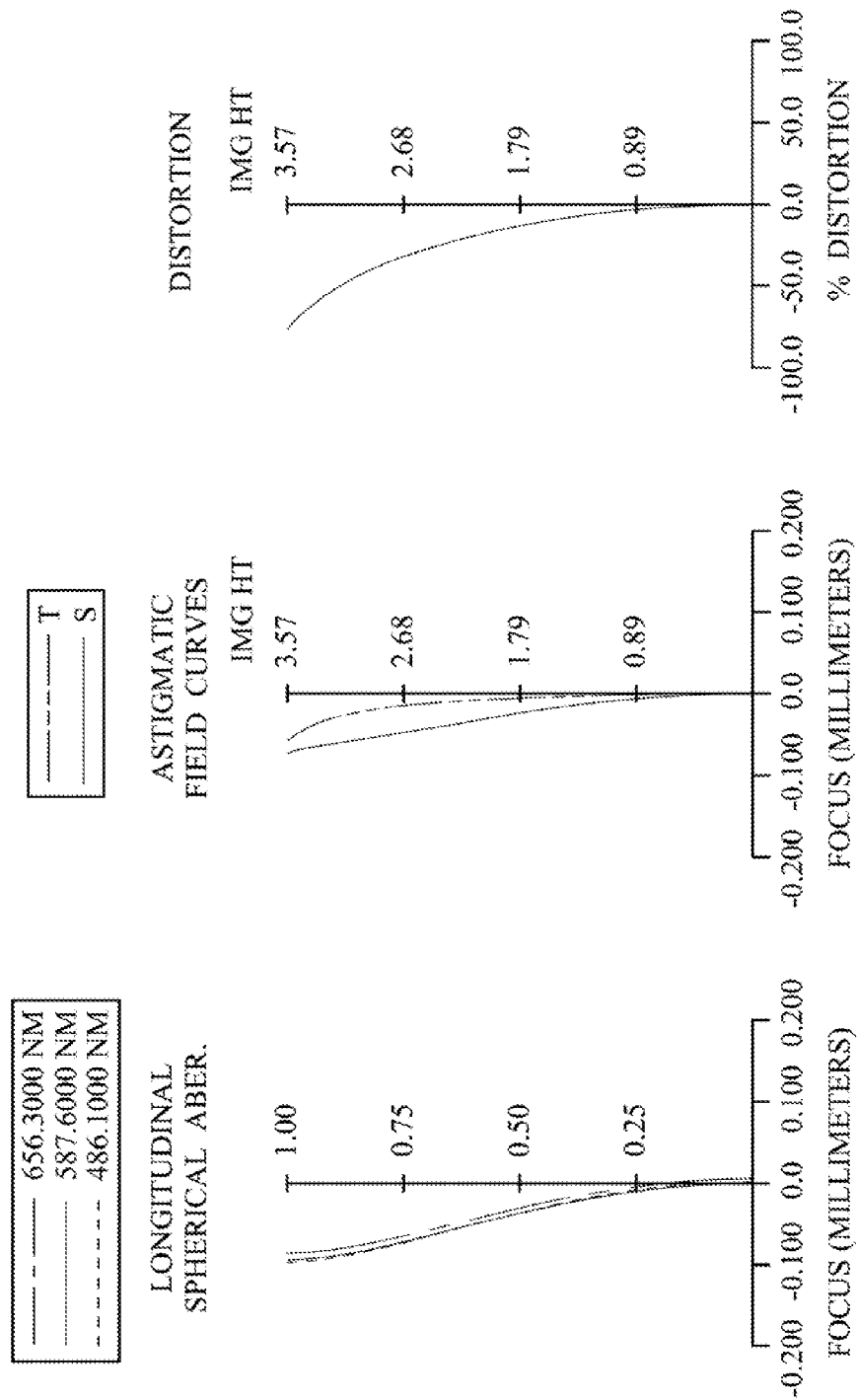
FIG. 2 shows spherical aberration curves, astigmatic field curves and a distortion curve of the monofocal photographing lens assembly according to the 1st Embodiment.

FIG. 1 is a schematic view of a monofocal photographing lens assembly according to the 1st embodiment of the present disclosure. FIG. 2 shows spherical aberration curves, astigmatic field curves and a distortion curve of the monofocal photographing lens assembly according to the 1st embodiment. In FIG. 1, the monofocal photographing lens assembly includes, in order from an object side to an image side, a first lens element 110, a second lens element 120, an aperture stop 100, a third lens element 130, a fourth lens element 140, a fifth lens element 150, a sixth lens element 160, an IR-cut filter 180, a cover glass 190, and an image plane 170.

The first lens element 110 with negative refractive power made of glass material and has a convex object-side surface 111 and a concave image-side surface 112.

The second lens element 120 with positive refractive power made of glass material and has a convex object-side surface 121 and a concave image-side surface 122.

The third lens element 130 with positive refractive power made of glass material and has a concave object-side surface 131 and a convex image-side surface 132. An air space is formed between the second lens element 120 and the third lens element 130.

The fourth lens element 140 with positive refractive power made of glass material and has a convex object-side surface 141 and a convex image-side surface 142.

The fifth lens element 150 with negative refractive power made of glass material and has a convex object-side surface 151 and a concave image-side surface 152. An air space is formed between the fourth lens element 140 and the fifth lens element 150.

The sixth lens element 160 with positive refractive power made of glass material and has a convex object-side surface 161 and a convex image-side surface 162. The image-side surface 152 of the fifth lens element 150 is cemented with the object-side surface 161 of the sixth lens element 160.

The IR-cut filter 180 is made of glass material, wherein the IR-cut filter 180 and the cover glass 190 are sequentially located between the sixth lens element 160 and the image plane 170, and will not affect the focal length of the monofocal photographing lens assembly.

In the monofocal photographing lens assembly according to the 1st embodiment, when a focal length of the monofocal photographing lens assembly is f, an f-number of the monofocal photographing lens assembly is Fno, and a half of a maximal field of view of the monofocal photographing lens assembly is HFOV, these parameters have the following values:

f=3.48 mm;
Fno=2.00; and
HFOV=77.3 degrees.

In the monofocal photographing lens assembly according to the 1st embodiment, when a refractive index of the sixth lens element 160 is N6, the following relationship is satisfied: N6=1.729.

In the monofocal photographing lens assembly according to the 1st embodiment, when an axial distance between the second lens element 120 and the third lens element 130 is T23, and an axial distance between the fourth lens element 140 and the fifth lens element 150 is T45, the following relationship is satisfied: T45/T23=0.22.

In the monofocal photographing lens assembly according to the 1st embodiment, when the focal length of the monofocal photographing lens assembly is f, and a focal length of the first lens element 10 is f1, the following relationship is satisfied: f/f1=−0.94.

In the monofocal photographing lens assembly according to the 1st embodiment, when the focal length of the monofocal photographing lens assembly is f, and a focal length of the second lens element 120 is f2, the following relationship satisfied: f/f2=0.11.

In the monofocal photographing lens assembly according to the 1st embodiment, when a sum of central thicknesses of the first 110 through sixth 160 lens elements (110-160) is ΣCT, and an axial distance between the object-side surface 111 of the first lens element 110 and the image-side surface 162 of the sixth lens element 160 is Td, the following relationship is satisfied: Td/ΣCT=1.14.

In the monofocal photographing lens assembly according to the 1st embodiment, when an effective radius of the object-side surface 111 of the first lens element 110 is SD11, and an effective radius of the image-side surface 162 of the sixth lens element 160 is SD62, the following relationship is satisfied: SD11/SD62=1.01.

In the monofocal photographing lens assembly according to the 1st embodiment, when an axial distance between the object-side surface 111 of the first lens element 110 and the aperture stop 100 is Dr1s, and an axial distance between the aperture stop 100 and the image-side surface 162 of the sixth lens element 160 is Dsr12, the following relationship is satisfied: Dr1s/Dsr12=0.63.

In the monofocal photographing lens assembly according to the 1st embodiment, when a relative illumination at an 80% position of a maximal image height on the image plane 170 of the monofocal photographing lens assembly is RI_08F, or, in other word, a relative illumination at an 80% position of a maximal field on the image plane 170 is RI_0.8F, the following relationship is satisfied: RI_08F=98.0%.

Figure 3:
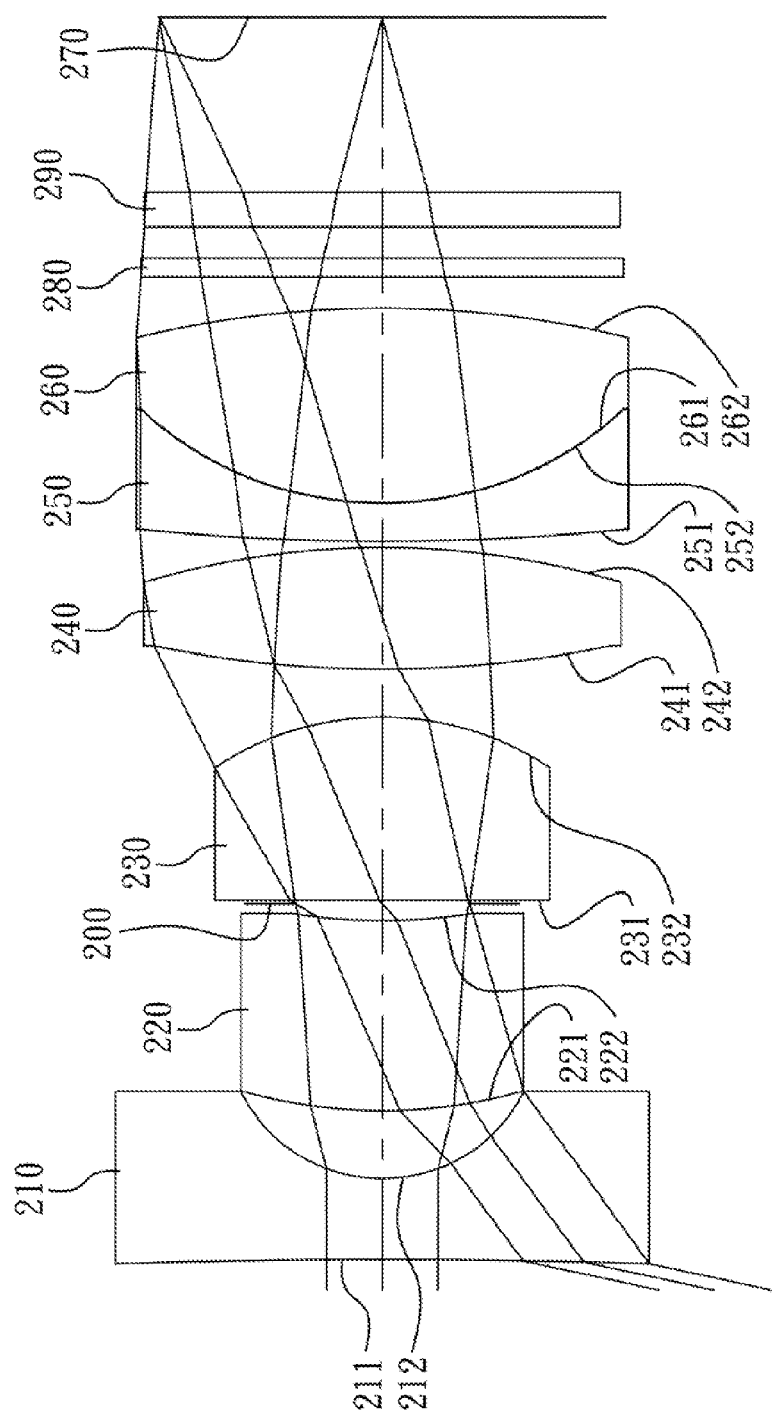
FIG. 3 is a schematic view of a monofocal photographing lens assembly according to the 2nd embodiment of the present disclosure.

The detailed optical data of the 1st embodiment are shown in Table 1 below.

cal photographing lens assembly according to the 2nd embodiment. In FIG. 3, the monofocal photographing lens assembly includes, in order from an object side to an image side, a first lens element 210, a second lens element 220, an aperture stop 200, a third lens element 230, a fourth lens element 240, a fifth lens element 250, a sixth lens element 260, an IR-cut filter 280, a cover glass 290, and an image plane 270.

The first lens element 210 with negative refractive power made of glass material and has a concave object-side surface 211 and a concave image-side surface 212.

The second lens element 220 with positive refractive power made of glass material and has a convex object-side surface 221 and a concave image-side surface 222.

The third lens element 230 with positive refractive power made of glass material and has a planar object-side surface 231 and a convex image-side surface 232. An air space is formed between the second lens element 220 and the third lens element 230.

The fourth lens element 240 with positive refractive power made of glass material and has a convex object-side surface 241 and a convex image-side surface 242.

The fifth lens element 250 with negative refractive power made of glass material and has a convex object-side surface 251 and a concave image-side surface 252. An air space is formed between the fourth lens element 240 and the fifth lens element 250.

TABLE 1

1st Embodiment
f = 3.48 mm, Fno = 2.00, HFOV = 77.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 120.582 | 1.100 | Glass | 1.697 | 55.5 | −3.71 |
| 2 | | 2.518 | 1.205 | | | | |
| 3 | Lens 2 | 7.994 | 2.939 | Glass | 1.847 | 23.8 | 31.21 |
| 4 | | 9.529 | 0.265 | | | | |
| 5 | Ape. Stop | Plano | 0.059 | | | | |
| 6 | Lens 3 | −308.743 | 2.730 | Glass | 1.516 | 64.1 | 8.62 |
| 7 | | −4.399 | 0.100 | | | | |
| 8 | Lens 4 | 28.521 | 1.998 | Glass | 1.729 | 54.7 | 10.25 |
| 9 | | −9.833 | 0.070 | | | | |
| 10 | Lens 5 | 25.376 | 0.600 | Glass | 1.847 | 23.8 | −8.68 |
| 11 | | 5.638 | 0.010 | cemented | | | |
| 12 | Lens 6 | 5.638 | 3.225 | Glass | 1.729 | 54.7 | 6.03 |
| 13 | | −15.157 | 1.000 | | | | |
| 14 | IR-cut filter | Plano | 0.300 | Glass | 1.517 | 64.2 | — |
| 15 | | Plano | 0.500 | | | | |
| 16 | cover glass | Plano | 0.550 | Glass | 1.517 | 64.2 | — |
| 17 | | Plano | 3.340 | | | | |
| 18 | image plane | Plano | — | | | | |

Reference wavelength (d-line) is 587.6 nm
Lens 5 and Lens 6 are cemented

Figure 4:
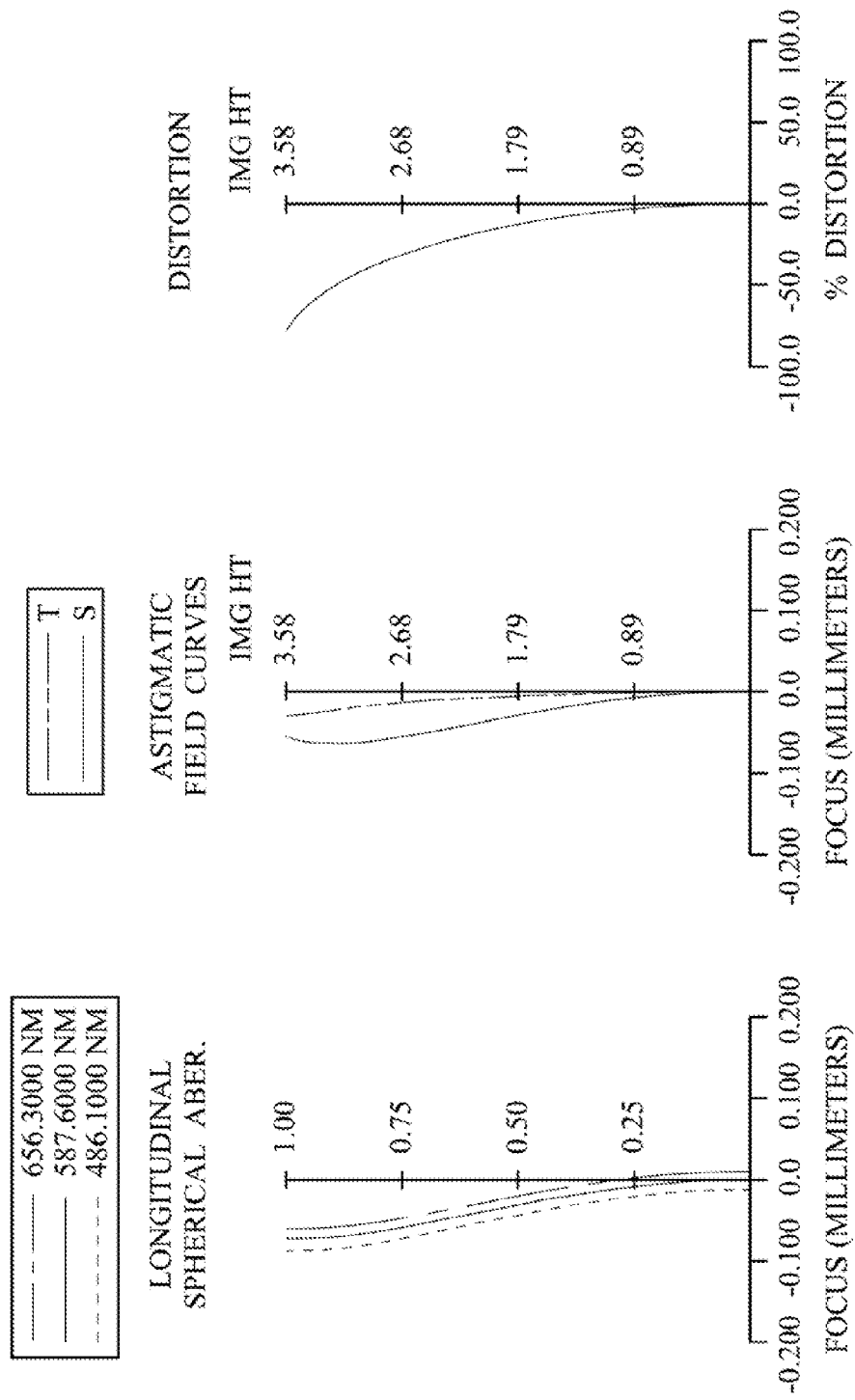
FIG. 4 shows spherical aberration curves, astigmatic field curves and a distortion curve of the monofocal photographing lens assembly according to the 2nd Embodiment.

In Table 1, the curvature radius, the thickness and the focal length are shown in millimeters (mm). Surface numbers 0-18 represent the surfaces sequentially arranged from the object-side to the image-side along the optical axis. This information related to Table 1 also applies to the Tables for the remaining embodiments, and so an explanation in this regard will not be provided again, 2nd Embodiment FIG. 3 is a schematic view of a monofocal photographing lens assembly according to the 2nd embodiment of the present disclosure. FIG. 4 shows spherical aberration curves, astigmatic field curves and a distortion curve of the monofo- The sixth lens element 260 with positive refractive power made of glass material and has a convex object-side surface 261 and a convex image-side surface 262. The image-side surface 252 of the fifth lens element 250 is cemented with the object-side surface 261 of the sixth lens element 260.

The IR-cut filter 280 is made of glass material, wherein the IR-cut filter 280 and the cover glass 290 are sequentially located between the sixth lens element 260 and the image plane 270, and will not affect the focal length of the monofocal photographing lens assembly.

The detailed optical data of the 2nd embodiment are shown in Table 2 below.

TABLE 2

2nd Embodiment
f = 3.56 mm, Fno = 2.00, HFOV = 77.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | −140.265 | 1.290 | Glass | 1.603 | 60.6 | −4.11 |
| 2 | | 2.531 | 1.100 | | | | |
| 3 | Lens 2 | 8.194 | 3.050 | Glass | 1.847 | 23.8 | 35.09 |
| 4 | | 9.383 | 0.270 | | | | |
| 5 | Ape. Stop | Plano | 0.053 | | | | |
| 6 | Lens 3 | ∞ | 2.940 | Glass | 1.729 | 54.7 | 6.57 |
| 7 | | −4.788 | 0.770 | | | | |
| 8 | Lens 4 | 18.419 | 1.950 | Glass | 1.729 | 54.7 | 10.93 |
| 9 | | −13.421 | 0.100 | | | | |
| 10 | Lens 5 | 41.196 | 0.600 | Glass | 1.847 | 23.8 | −7.89 |
| 11 | | 5.711 | 0.010 | cemented | | | |
| 12 | Lens 6 | 5.714 | 3.130 | Glass | 1.729 | 54.7 | 6.20 |
| 13 | | −16.692 | 0.500 | | | | |
| 14 | IR-cut filter | Plano | 0.300 | Glass | 1.517 | 64.2 | — |
| 15 | | Plano | 0.500 | | | | |
| 16 | cover glass | Plano | 0.550 | Glass | 1.517 | 64.2 | — |
| 17 | | Plano | 2.816 | | | | |
| 18 | image plane | Plano | — | | | | |

Reference wavelength (d-line) is 587.8 nm
Lens 5 and Lens 6 are cemented

In the monofocal photographing lens assembly according to the 2nd embodiment, the definitions of f, Fno, HFOV, N6, T23, T45, f1, f2, ΣCT, Td, SD11, SDG2, Dr1s, Dsr12, and RI_0.8F are the same as those stated in the 1st embodiment with corresponding values for the 2nd embodiment. Moreover, these parameters can be calculated from Table 2 as the following values and satisfy the following relationships:

| | |
|---|---|
| f (mm) | 3.56 |
| Fno | 2.00 |
| HFOV (deg.) | 77.5 |
| N6 | 1.729 |
| T45/T23 | 0.31 |
| f/f1 | −0.87 |
| f/f2 | 0.10 |
| Td/ΣCT | 1.18 |
| SD11/SD62 | 1 09 |
| Dr1s/Dsr12 | 0.60 |
| RI_0.8F (%) | 96.8 |

3rd Embodiment

Figure 5:
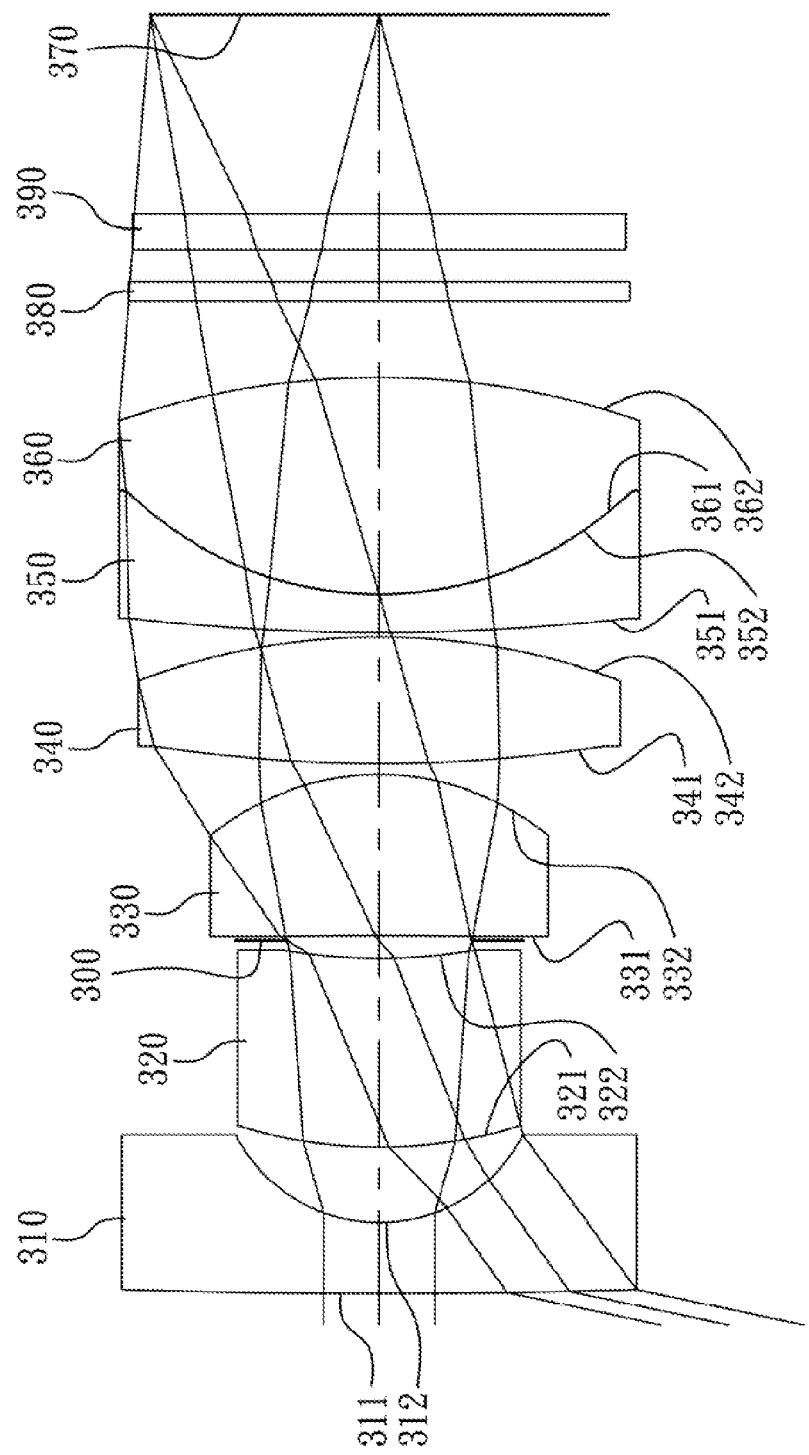
FIG. 5 is a schematic view of a monofocal photographing lens assembly according to the 3rd embodiment of the present disclosure.
Figure 6:
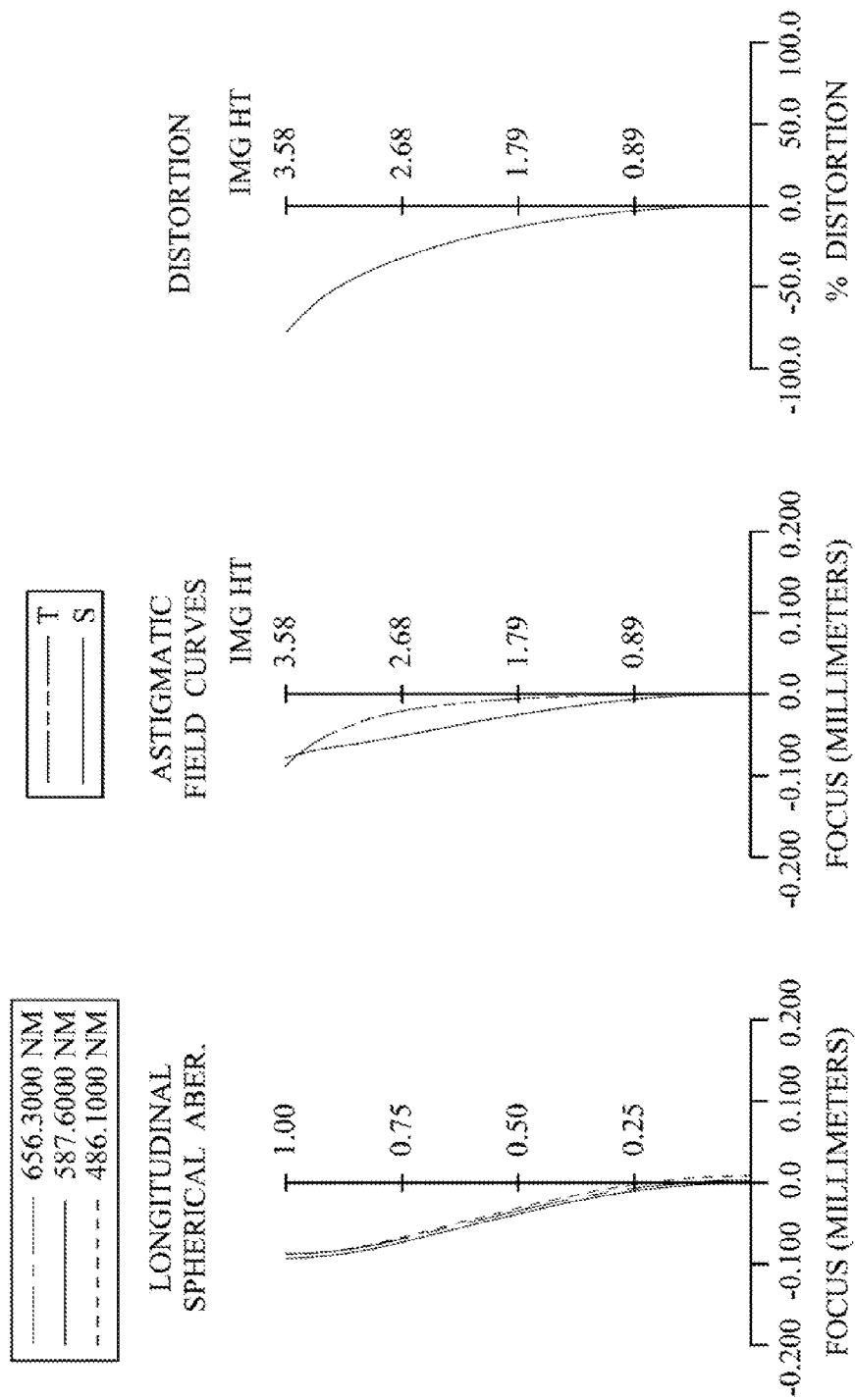
FIG. 6 shows spherical aberration curves, astigmatic field curves and a distortion curve of the monofocal photographing lens assembly according to the 3rd Embodiment.

FIG. 5 is a schematic view of a monofocal photographing lens assembly according to the 3rd embodiment of the present disclosure. FIG. 6 shows spherical aberration curves, astigmatic field curves and a distortion curve of the monofocal photographing lens assembly according to the 3rd embodiment. In FIG. 5, the monofocal photographing lens assembly includes, in order from an object side to an image side, a first lens element 310, a second lens element 320, an aperture stop 300, a third lens element 330, a fourth lens element 340, a fifth lens element 350, a sixth lens element 360, an IR-cut filter 380, a cover glass 390, and an image plane 370.

The first lens element 310 with negative refractive power made of glass material and has a convex object-side surface 311 and a concave image-side surface 312.

The second lens element 320 with positive refractive power made of glass material and has a convex object-side surface 321 and a concave image-side surface 322.

The third lens element 330 with positive refractive power made of glass material and has a concave object-side surface 331 and a convex image-side surface 332. An air space is formed between the second lens element 320 and the third lens element 330.

The fourth lens element 340 with positive refractive power made of glass material and has a convex object-side surface 341 and a convex image-side surface 342.

The fifth lens element 350 with negative refractive power made of glass material and has a convex object-side surface 351 and a concave image-side surface 352. An air space is formed between the fourth lens element 340 and the fifth lens element 350.

The sixth lens element 360 with positive refractive power made of glass material and has a convex object-side surface 361 and a convex image-side surface 362. The image-side surface 352 of the fifth lens element 350 is cemented with the object-side surface 361 of the sixth lens element 360.

The IR-cut filter 380 is made of glass material, wherein the IR-cut filter 380 and the cover glass 390 are sequentially located between the sixth lens element 360 and the image plane 370, and will not affect the focal length of the monofocal photographing lens assembly.

The detailed optical data of the 3rd embodiment are shown in Table 3 below.

TABLE 3

3rd Embodiment
f = 3.49 mm, Fno = 2.00, HFOV = 77.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 130.058 | 1.100 | Glass | 1.713 | 53.9 | −3.60 |

TABLE 3-continued

3rd Embodiment
f = 3.49 mm, Fno = 2.00, HFOV = 77.9 deg.

| Surface # | | Curvature Radius | Thickness | Material | Index | Abbe # | Focal length |
|---|---|---|---|---|---|---|---|
| 2 | | 2.510 | 1.190 | | | | |
| 3 | Lens 2 | 7.438 | 2.950 | Glass | 1.847 | 23.8 | 27.50 |
| 4 | | 8.943 | 0.280 | | | | |
| 5 | Ape. Stop | Plano | 0.075 | | | | |
| 6 | Lens 3 | −98.921 | 2.510 | Glass | 1.516 | 64.1 | 8.31 |
| 7 | | −4.146 | 0.170 | | | | |
| 8 | Lens 4 | 22.698 | 1.980 | Glass | 1.729 | 54.7 | 10.29 |
| 9 | | −10.791 | 0.070 | | | | |
| 10 | Lens 5 | 33.710 | 0.600 | Glass | 1.847 | 23.8 | −8.08 |
| 11 | | 5.641 | 0.010 | cemented | | | |
| 12 | Lens 6 | 5.644 | 3.380 | Glass | 1.729 | 54.7 | 5.79 |
| 13 | | −12.501 | 1.200 | | | | |
| 14 | IR-cut filter | Plano | 0.300 | Glass | 1.517 | 64.2 | — |
| 15 | | Plano | 0.500 | | | | |
| 16 | cover glass | Plano | 0.550 | Glass | 1.517 | 64.2 | — |
| 17 | | Plano | 3.129 | | | | |
| 18 | image plane | Plano | — | | | | |

Reference wavelength (d-line) is 587.6 nm
Lens 5 and Lens 6 are cemented

In the monofocal photographing lens assembly according to the 3rd embodiment, the definitions of f, Fno, HFOV, N6, T23, T45, f1, f2, ΣCT, Td, SD11, SD62, Dr1s, Dsr12, and RI_0.8F are the same as those stated in the 1st embodiment with corresponding values for the 3rd embodiment. Moreover, these parameters can be calculated from Table 3 as the following values and satisfy the following relationships:

| | |
|---|---|
| f (min) | 3.49 |
| Fno | 2.00 |
| HFOV (deg.) | 77.9 |
| N6 | 1.729 |
| T45/T23 | 0.20 |
| f/f1 | −0.97 |
| f/f2 | 0.13 |
| Td/ΣCT | 1.14 |
| SD11/SD62 | 0.99 |
| Dr1s/Dsr12 | 0.63 |
| RI_0.8F (%) | 98.3 |

4th Embodiment

Figure 7:
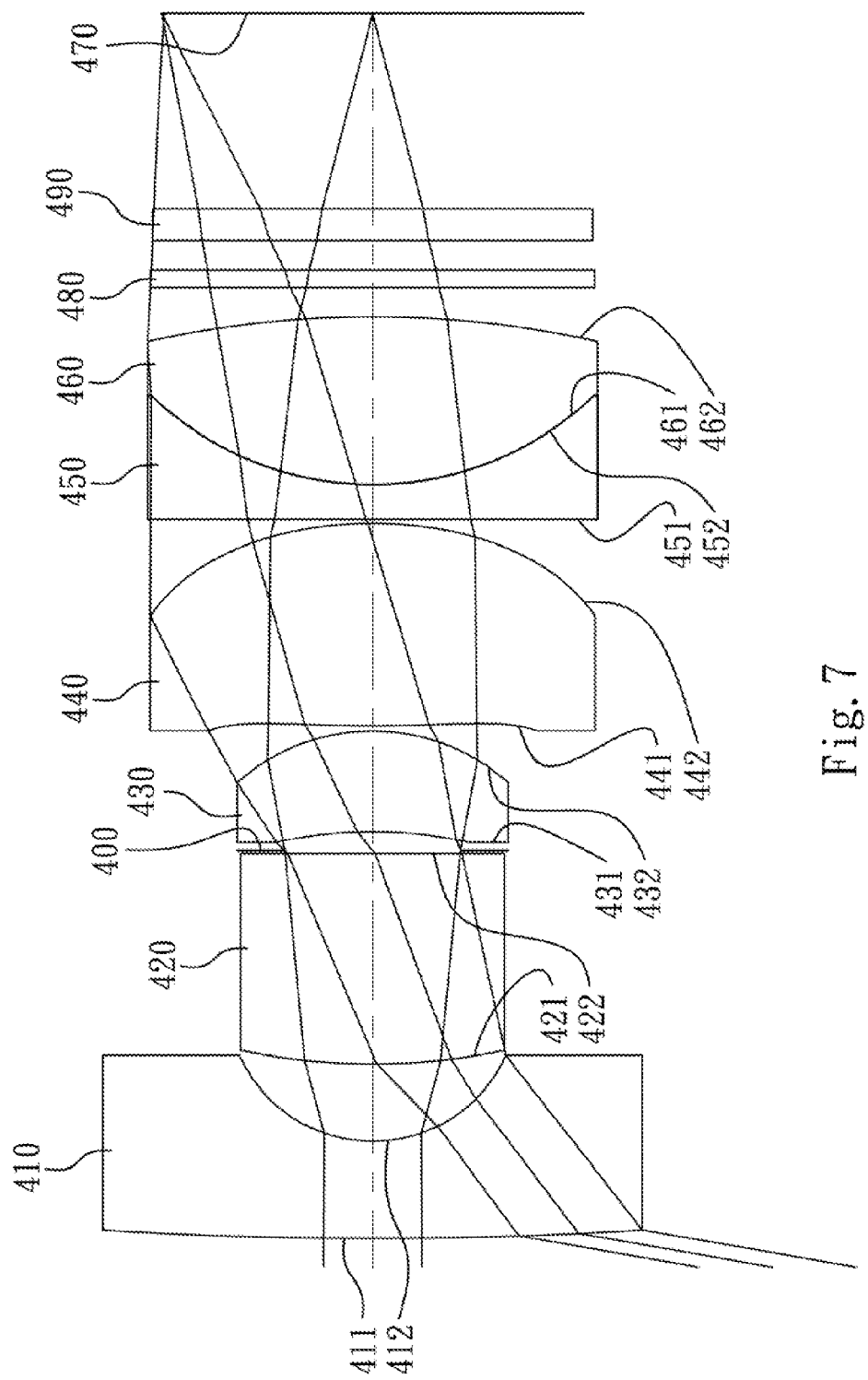
FIG. 7 is a schematic view of a monofocal photographing lens assembly according to the 4th embodiment of the present disclosure.
Figure 8:
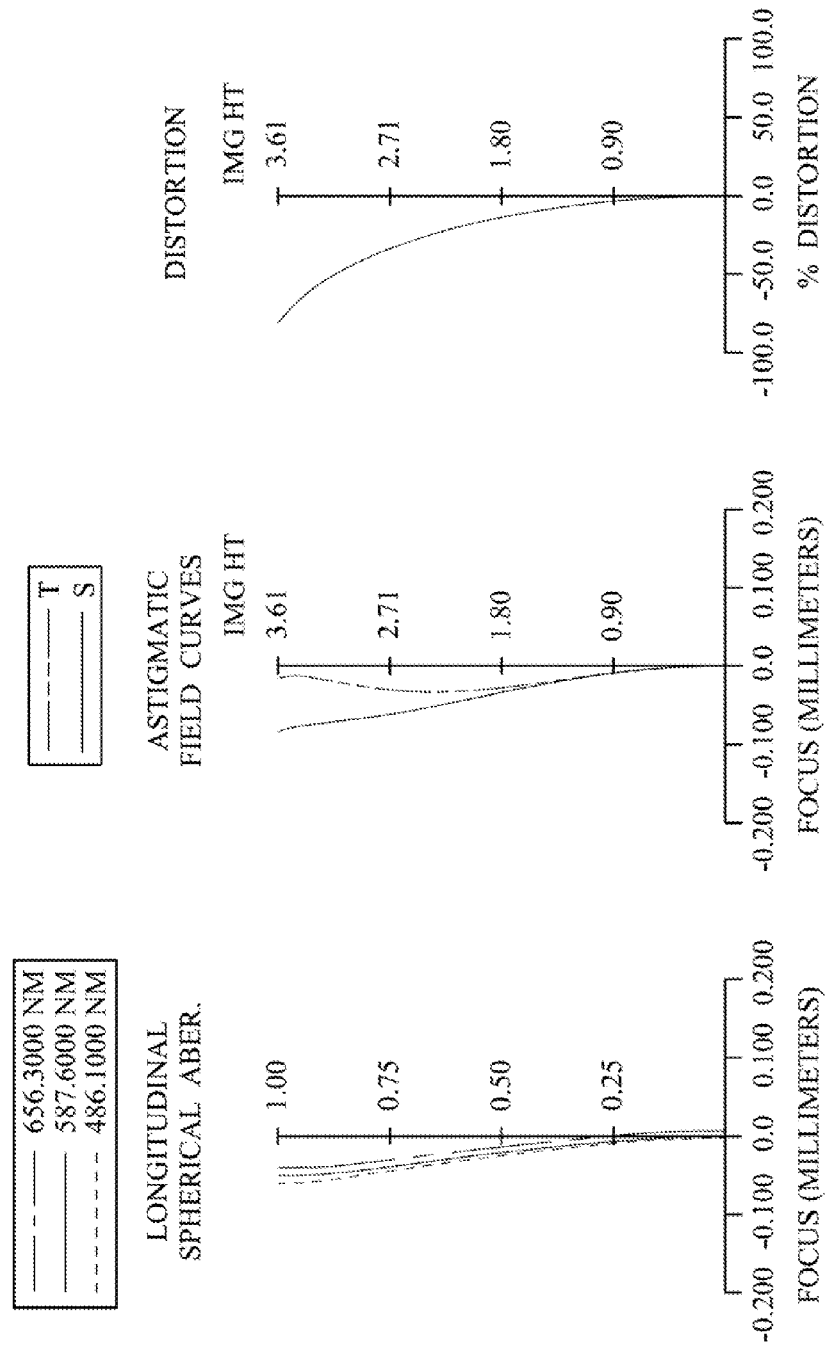
FIG. 8 shows spherical aberration curves, astigmatic field curves and a distortion curve of the monofocal photographing lens assembly according to the 4th Embodiment.

FIG. 7 is a schematic view of a monofocal photographing lens assembly according to the 4th embodiment of the present disclosure. FIG. 8 shows spherical aberration curves, astigmatic field curves and a distortion curve of the monofocal photographing lens assembly according to the 4th embodiment. In FIG. 7, the monofocal photographing lens assembly includes, in order from an object side to an image side, a first lens element 410, a second lens element 420, an aperture stop 400, a third lens element 430, a fourth lens element 440, a fifth lens element 450, a sixth lens element 460, an IR-cut filter 480, a cover glass 490, and an image plane 470.

The first lens element 410 with negative refractive power made of glass material and has a convex object-side surface 411 and a concave image-side surface 412.

The second lens element 420 with positive refractive power made of glass material and has a convex object-side surface 421 and a concave image-side surface 422.

The third lens element 430 with positive refractive power made of glass material and has a concave object-side surface 431 and a convex image-side surface 432. An air space is formed between the second lens element 420 and the third lens element 430.

The fourth lens element 440 with positive refractive power made of glass material and has a convex object-side surface 441 and a convex image-side surface 442, wherein the object-side surface 441 and the image-side surface 442 of the fourth lens element 440 are aspheric.

The fifth lens element 450 with negative refractive power made of glass material and has a convex object-side surface 451 and a concave image-side surface 452. An air space is formed between the fourth lens element 440 and the fifth lens element 450.

The sixth lens element 460 with positive refractive power made of glass material and has a convex object-side surface 461 and a convex image-side surface 462. The image-side surface 452 of the fifth lens element 450 is cemented with the object-side surface 461 of the sixth lens element 460.

The IR-cut filter 480 is made of glass material, wherein the IR-cut filter 480 and the cover glass 490 are sequentially located between the sixth lens element 460 and the image plane 470, and will not affect the focal length of the monofocal photographing lens assembly.

The equation of the aspheric surface profiles of the aforementioned lens elements of the 4th embodiment is expressed as follows:

$$X(Y) = (Y^2/R)/(1 + sqrt(1 - (1+k)\times(Y/R)^2)) + \sum_i (Ai)\times(Y^i),$$

wherein,

X is the relative distance of a point on the aspheric surface spaced at a distance V from the optical axis relative to the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

The detailed optical data of the 4th embodiment are shown in Table 4 and the aspheric surface data are shown in Table 5 below.

TABLE 4

4th Embodiment
f = 3.36 mm, Fno = 2.00, HFOV = 80.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 71.958 | 1.663 | Glass | 1.720 | 50.4 | −3.63 |
| 2 | | 2.500 | 1.330 | | | | |
| 3 | Lens 2 | 11.151 | 3.600 | Glass | 1.805 | 25.4 | 13.96 |
| 4 | | 1200.480 | 0.054 | | | | |
| 5 | Ape. Stop | Plano | 0.327 | | | | |
| 6 | Lens 3 | −7.415 | 1.716 | Glass | 1.516 | 64.1 | 11.25 |
| 7 | | −3.514 | 0.100 | | | | |
| 8 | Lens 4 | 24.809(ASP) | 3.458 | Glass | 1.729 | 54.7 | 7.86 |
| 9 | | −7.01(ASP) | 0.070 | | | | |
| 10 | Lens 5 | 13201.975 | 0.600 | Glass | 1.847 | 23.8 | −6.50 |
| 11 | | 5.500 | 0.010 | cemented | | | |
| 12 | Lens 6 | 5.500 | 2.871 | Glass | 1.729 | 54.7 | 6.07 |
| 13 | | −17.702 | 0.500 | | | | |
| 14 | IR-cut filter | Plano | 0.300 | Glass | 1.517 | 64.2 | — |
| 15 | | Plano | 0.500 | | | | |
| 16 | cover glass | Plano | 0.550 | Glass | 1.517 | 64.2 | — |
| 17 | | Plano | 3.342 | | | | |
| 18 | image plane | Plano | — | | | | |

Reference wavelength (d-line) is 587.6 nm
Lens 5 and Lens 6 are cemented

TABLE 5

Aspheric Coefficients

| Surface # | 8 | 9 |
|---|---|---|
| k = | 1.8050E+01 | 1.6354E+00 |
| A4 = | −2.2784E−03 | −3.1197E−04 |
| A6 = | −1.6750E−04 | −4.6504E−06 |
| A8 = | 1.6319E−05 | −1.5713E−06 |
| A10 = | −3.4708E−06 | −4.0133E−08 |

In Table 5, k represents the conic coefficient of the equation of the aspheric surface profiles according to the 4th embodiment. A1-A10 represent the aspheric coefficients ranging from the 1st order to the 10th order.

In the monofocal photographing lens assembly according to the 4th embodiment, the definitions of f, Fno, HFOV, N6, T23, T45, f1, f2, ΣCT, Td, SD11, SD62, Dr1s, Dsr12, and RI_0.8F are the same as those stated in the 1st embodiment with corresponding values for the 4th embodiment. Moreover, these parameters can be calculated from Table 4 and Table 5 as the following values and satisfy the following relationships:

| | |
|---|---|
| f (mm) | 3.36 |
| Fno | 2.00 |
| HFOV (deg.) | 80.0 |
| N6 | 1.729 |
| T45/T23 | 0.18 |
| f/f1 | −0.92 |
| f/f2 | 0.24 |
| Td/ΣCT | 1.14 |
| SD11/SD62 | 1.20 |
| Dr1s/Dsr12 | 0.73 |
| RI_0.8F (%) | 97.9 |

5th Embodiment

Figure 9:
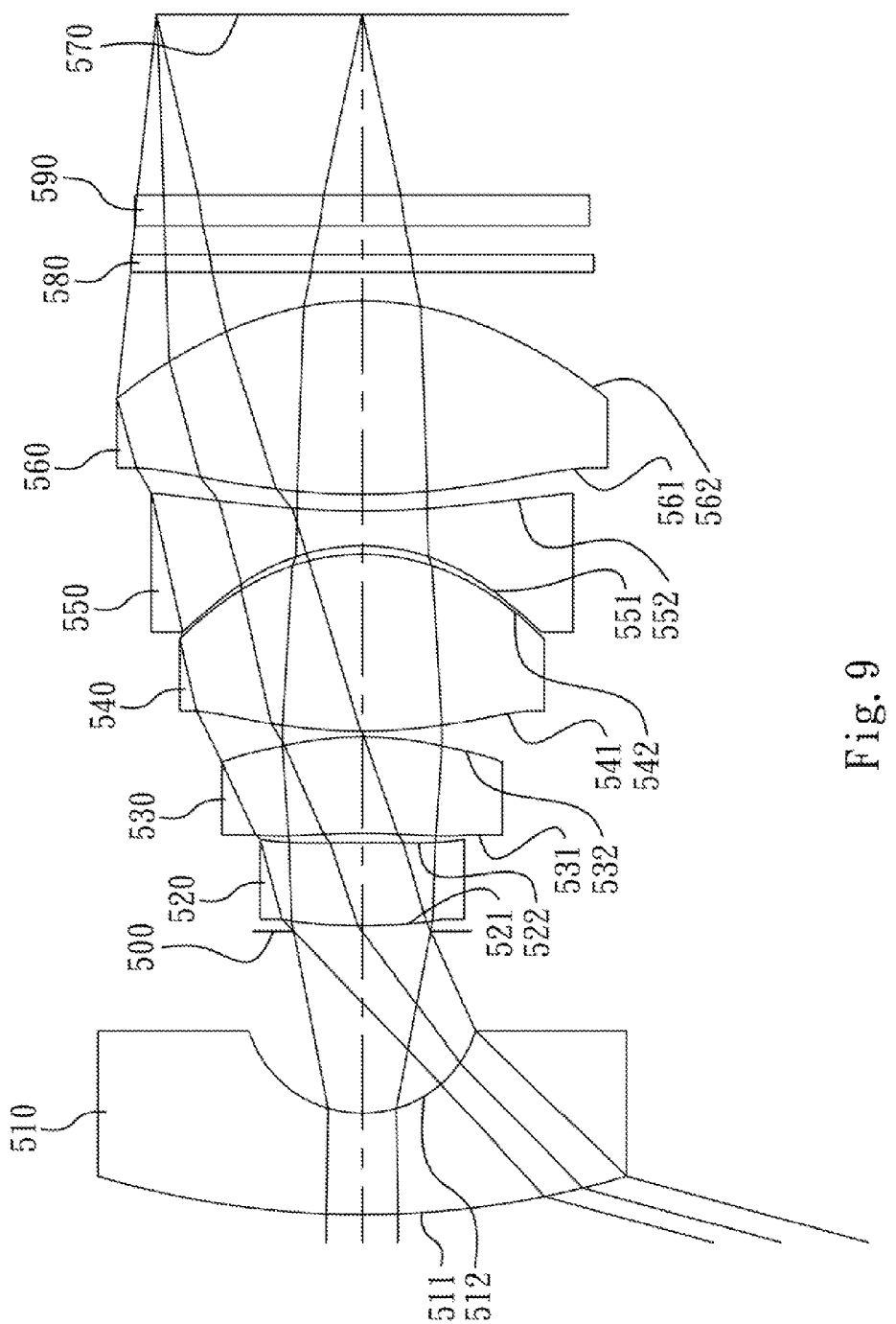
FIG. 9 is a schematic view of a monofocal photographing lens assembly according to the 5th embodiment of the present disclosure.
Figure 10:
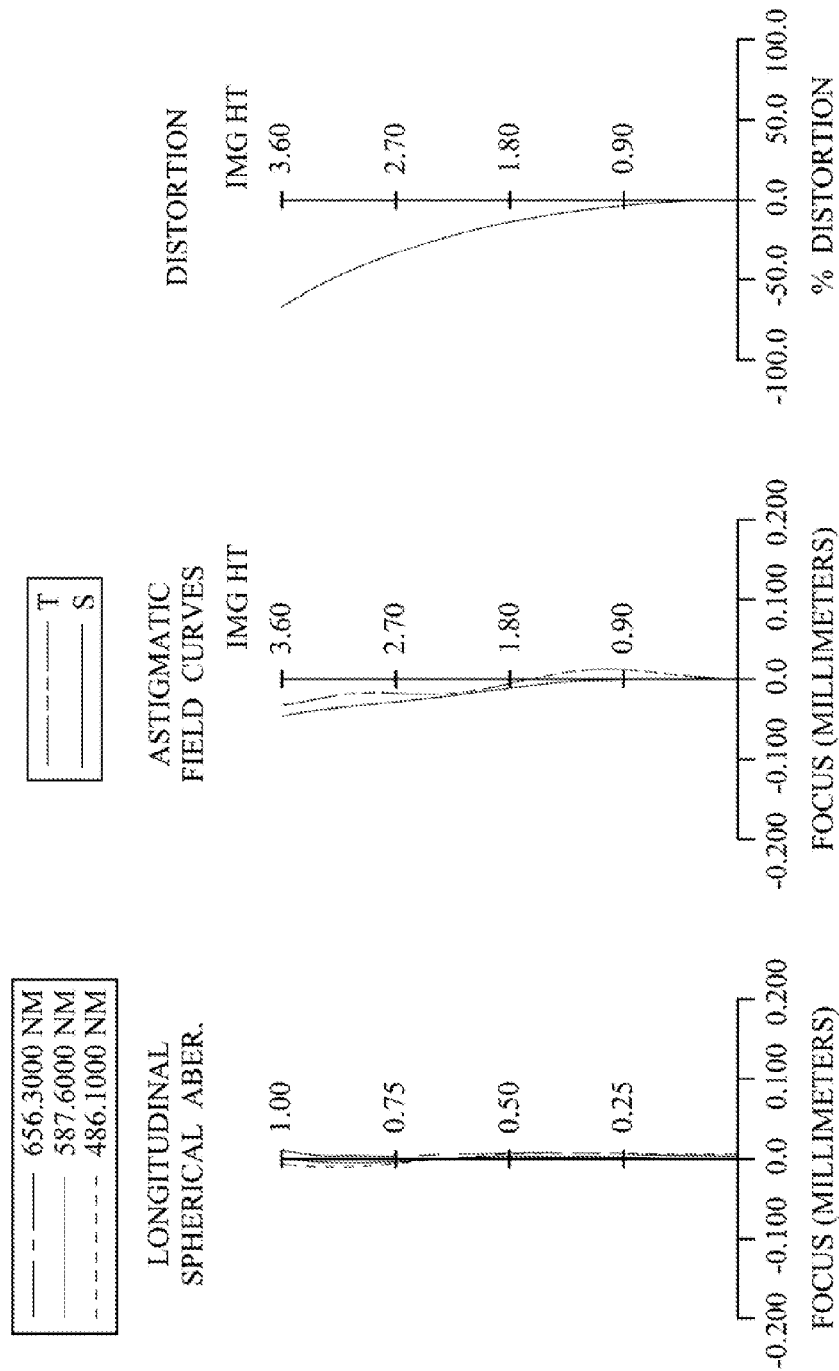
FIG. 10 shows spherical aberration curves, astigmatic field curves and a distortion curve of the monofocal photographing lens assembly according to the 5th Embodiment.

FIG. 9 is a schematic view of a monofocal photographing lens assembly according to the 5th embodiment of the present disclosure. FIG. 10 shows spherical aberration curves, astigmatic field curves and a distortion curve of the monofocal photographing lens assembly according to the 5th embodiment. In FIG. 9, the monofocal photographing lens assembly includes, in order from an object side to an image side, a first lens element 510, an aperture stop 500, a second lens element 520, a third lens element 530, a fourth lens element 540, a fifth lens element 550, a sixth lens element 560, an IR-cut filter 580, a cover glass 590, and an image plane 570.

The first lens element 510 with negative refractive power made of glass material and has a convex object-side surface 511 and a concave image-side surface 512.

The second lens element 520 with positive refractive power made of glass material and has a convex object-side surface 521 and a concave image-side surface 522, wherein the object-side surface 521 and the image-side surface 522 of the second lens element 520 are aspheric.

The third lens element 530 with positive refractive power made of glass material and has a concave object-side surface 531 and a convex image-side surface 532, wherein the object-side surface 531 and the image-side surface 532 of the third lens element 530 are aspheric. An air space is formed between the second lens element 520 and the third lens element 530.

The fourth lens element 540 with positive refractive power made of glass material and has a convex object-side surface 541 and a convex image-side surface 542, wherein the object-side surface 541 and the image-side surface 542 of the fourth lens element 540 are aspheric.

The fifth lens element 550 with negative refractive power made of glass material and has a concave object-side surface 551 and a concave image-side surface 552, wherein the object-side surface 551 and the image-side surface 552 of the fifth lens element 550 are aspheric. An air space is formed between the fourth lens element 540 and the fifth lens element 550.

The sixth lens element 560 with positive refractive power made of glass material and has a convex object-side surface 561 and a convex image-side surface 562, wherein the object-side surface 561 and the image-side surface 562 of the sixth lens element 560 are aspheric.

The IR-cut filter 580 is made of glass material, wherein the IR-cut filter 580 and the cover glass 590 are sequentially located between the sixth lens element 560 and the image plane 570, and will not affect the focal length of the monofocal photographing lens assembly.

The detailed optical data of the 5th embodiment are shown in Table 6 and the aspheric surface data are shown in Table 7 below.

TABLE 6

5th Embodiment
f = 3.01 mm, Fno = 2.40, HFOV = 74.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 16.291 | 1.769 | Glass | 1.713 | 53.9 | −3.55 |
| 2 | | 2.091 | 3.186 | | | | |
| 3 | Ape. Stop | Plano | 0.100 | | | | |
| 4 | Lens 2 | 10.192(ASP) | 1.445 | Glass | 1.847 | 23.8 | 12.06 |
| 5 | | 4475.394(ASP) | 0.164 | | | | |
| 6 | Lens 3 | −13.142(ASP) | 1.691 | Glass | 1.516 | 64.1 | 17.17 |
| 7 | | −5.527(ASP) | 0.100 | | | | |
| 8 | Lens 4 | 9.091(ASP) | 3.103 | Glass | 1.713 | 53.8 | 4.17 |
| 9 | | −3.787(ASP) | 0.150 | | | | |
| 10 | Lens 5 | −3.586(ASP) | 0.600 | Glass | 1.847 | 23.8 | −3.36 |
| 11 | | 14.740(ASP) | 0.300 | | | | |
| 12 | Lens 6 | 11.936(ASP) | 3.391 | Glass | 1.729 | 54.7 | 5.42 |
| 13 | | −5.206(ASP) | 0.500 | | | | |
| 14 | IR-cut filter | Plano | 0.300 | Glass | 1.517 | 64.2 | — |
| 15 | | Plano | 0.500 | | | | |
| 16 | cover glass | Plano | 0.550 | Glass | 1.517 | 64.2 | — |
| 17 | | Plano | 3.156 | | | | |
| 18 | image plane | Plano | — | | | | |

Reference wavelength (d-line) is 587.6 nm

TABLE 7

Aspheric Coefficients

| Surface # | 4 | 5 | 6 | 7 | 8 |
|---|---|---|---|---|---|
| k = | 6.4624E+00 | −2.0000E+01 | −2.0000E+01 | −2.6610E+00 | 5.3736E+00 |
| A4 = | 6.5578E−04 | 2.0521E−05 | 4.4083E−03 | 3.2046E−03 | −1.1827E−03 |
| A6 = | 1.4479E−03 | 1.3577E−03 | 1.0801E−03 | 2.5710E−05 | −2.5622E−04 |
| A8 = | −1.8137E−04 | 2.4518E−04 | 7.2006E−05 | 5.5594E−06 | 2.7187E−05 |
| A10 = | 1.5708E−05 | −3.7294E−05 | −3.4865E−05 | −7.9555E−06 | 2.8728E−06 |

| Surface # | 9 | 10 | 11 | 12 | 13 |
|---|---|---|---|---|---|
| k = | −3.2054E−01 | −2.4185E−01 | −4.5866E+00 | −7.9453E−01 | −6.2258E−01 |
| A4 = | 7.1705E−04 | −3.4561E−05 | −3.6657E−04 | −3.1074E−04 | 4.4726E−04 |
| A6 = | −1.1724E−04 | 4.6887E−05 | −2.1785E−05 | −2.2338E−05 | 2.0435E−06 |
| A8 = | 1.0242E−05 | −6.8127E−06 | −9.3995E−07 | 6.1163E−07 | 2.1012E−06 |
| A10 = | 6.1934E−08 | 1.8807E−06 | 8.7004E−08 | −7.3451E−08 | −1.0727E−07 |

In Table 7, k represents the conic coefficient of the equation of the aspheric surface profiles according to the 5th embodiment. A1-A10 represent the aspheric coefficients ranging from the 1st order to the 10th order.

In the monofocal photographing lens assembly according to the 5th embodiment, the definitions of f, Fno, HFOV, N6, T23, T45, f1, f2, ΣCT, Td, SD11, SD62, Dr1s, Dsr12, and RI_08F are the same as those stated in the 1st embodiment with corresponding values for the 5th embodiment. Moreover, these parameters can be calculated from Table 6 and Table 7 as the following values and satisfy the following relationships:

| | |
|---|---|
| f (mm) | 3.01 |
| Fno | 2.40 |
| HFOV (deg.) | 74.5 |
| N6 | 1.729 |

-continued

| | |
|---|---|
| T45/T23 | 0.91 |
| f/f1 | −0.85 |
| f/f2 | 0.25 |
| Td/ΣCT | 1.33 |
| SD11/SD62 | 1.08 |
| Dr1s/Dsr12 | 0.45 |
| RI_0.8F (%) | 79.7 |

6th Embodiment

Figure 11:
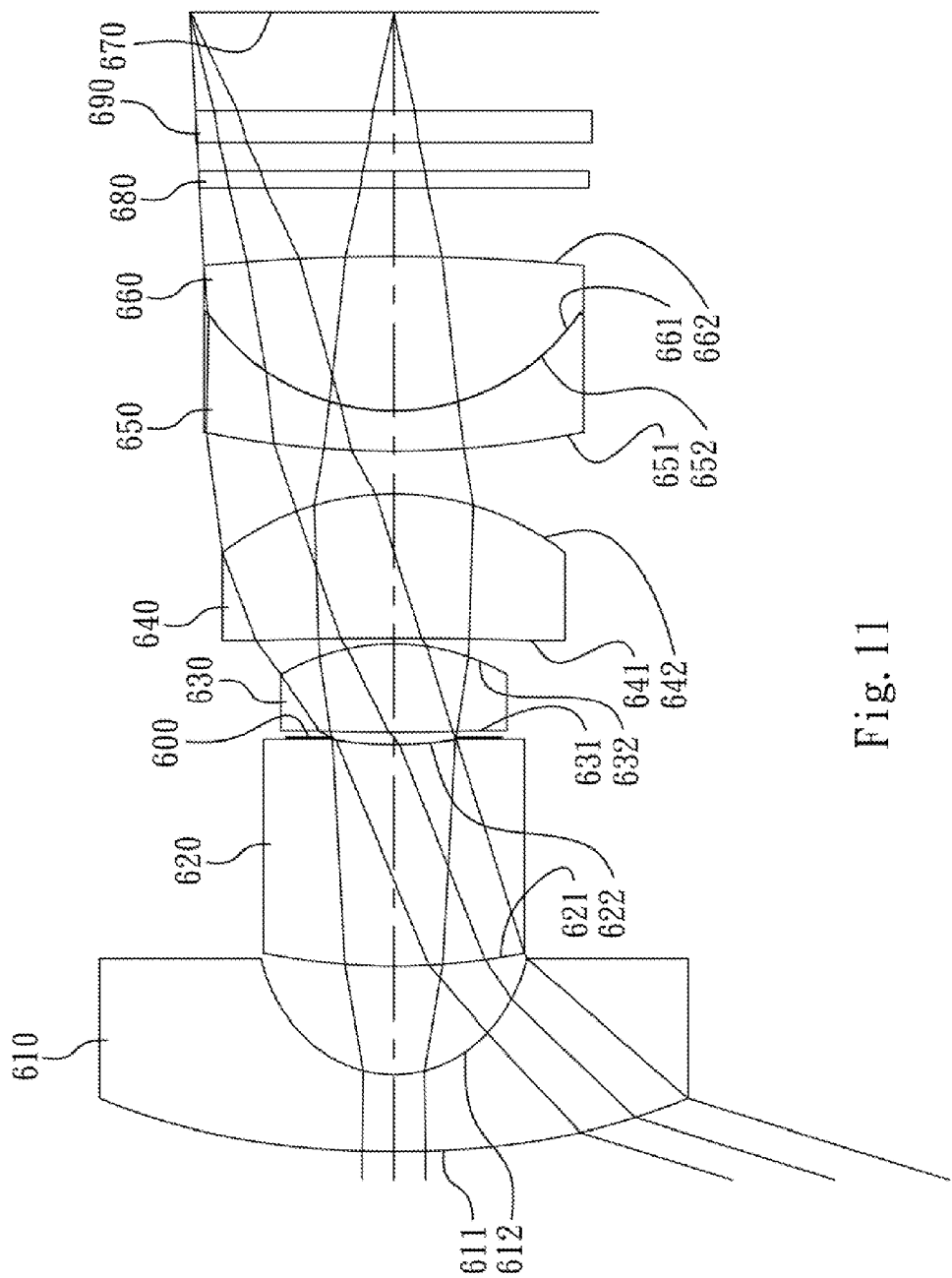
FIG. 11 is a schematic view of a monofocal photographing lens assembly according to the 6th embodiment of the present disclosure.
Figure 12:
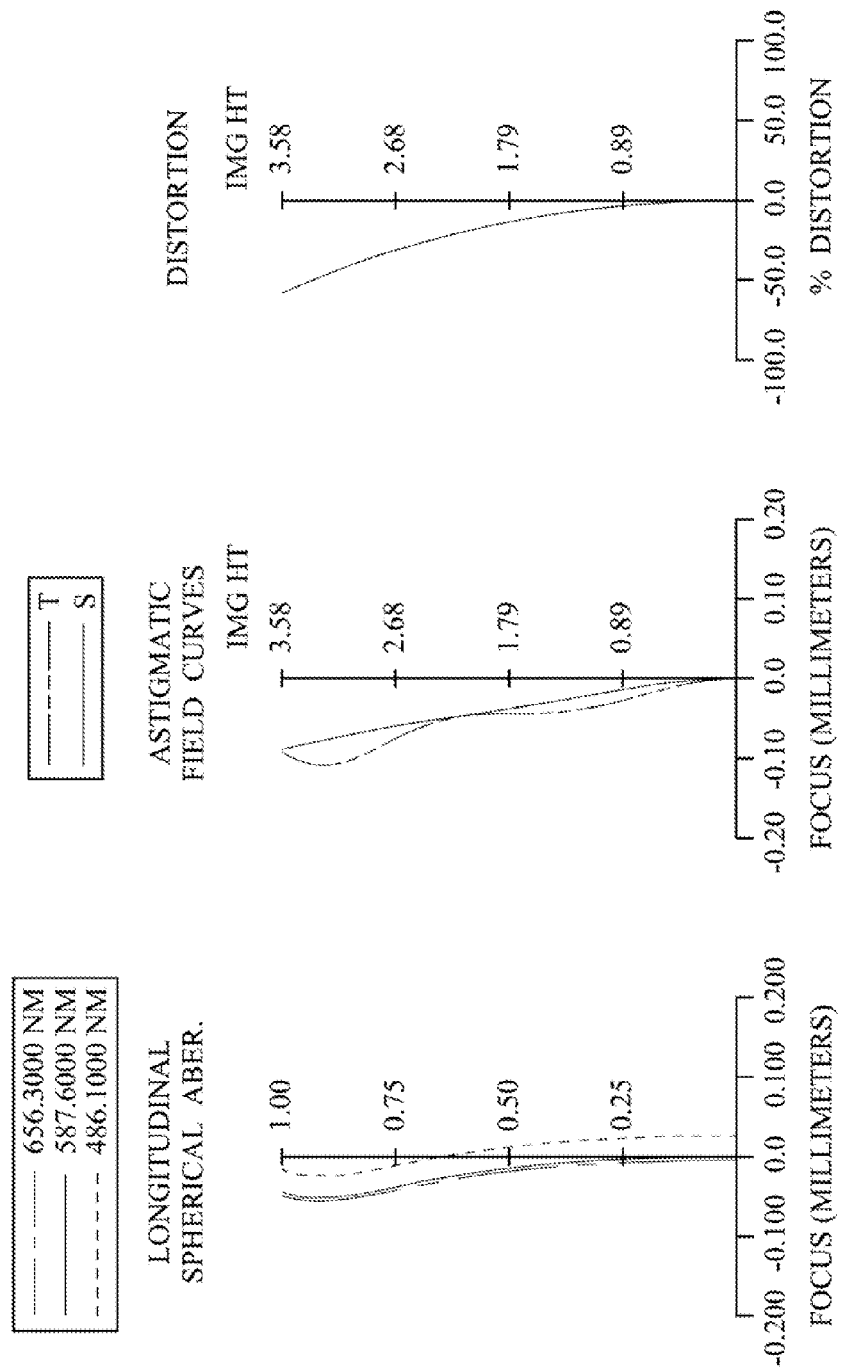
FIG. 12 shows spherical aberration curves, astigmatic field curves and a distortion curve of the monofocal photographing lens assembly according to the 6th embodiment.

FIG. 11 is a schematic view of a monofocal photographing lens assembly according to the 6th embodiment of the present disclosure. FIG. 12 shows spherical aberration curves, astigmatic field curves and a distortion curve of the monofocal photographing lens assembly according to the 6th embodiment. In FIG. 11, the monofocal photographing lens assembly includes, in order from an object side to an image side, a first lens element 610, a second lens element 620, an aperture stop 600, a third lens element 630, a fourth lens element 640, a fifth lens element 650, a sixth lens element 660, an IR-cut filter 680, a cover glass 690, and an image plane 670.

The first lens element 610 with negative refractive power made of glass material and has a convex object-side surface 611 and a concave image-side surface 612, wherein the object-side surface 611 and the mage-side surface 612 of the first lens element 610 are aspheric.

The second lens element 620 with negative refractive power made of glass material and has a convex object-side surface 621 and a concave image-side surface 622 being aspheric.

The third lens element 630 with positive refractive power made of glass material and has a convex object-side surface 631 and a convex image-side surface 632. An air space is formed between the second lens element 620 and the third lens element 630.

The fourth lens element 640 with positive refractive power made of glass material and has a concave object-side surface 641 and a convex image-side surface 642.

The fifth lens element 650 with negative refractive power made of glass material and has a convex object-side surface 651 and a concave image-side surface 652. An air space is formed between the fourth lens element 640 and the fifth lens element 650.

The sixth lens element 660 with positive refractive power made of glass material and has a convex object-side surface 661 and a convex image-side surface 662. The image-side surface 652 of the fifth lens element 650 is cemented with the object-side surface 661 of the sixth lens element 660.

The IR-cut filter 680 is made of glass material, wherein the IR-cut filter 680 and the cover glass 690 are sequentially located between the sixth lens element 660 and the image plane 670, and will not affect the focal length of the monofocal photographing lens assembly.

The detailed optical data of the 6th embodiment are shown in Table 8 and the aspheric surface data are shown in Table 9 below.

TABLE 8

6th Embodiment
f = 2.66 mm, Fno = 2.40, HFOV = 72.8 deg,

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 19.053(ASP) | 1.346 | Glass | 1.713 | 53.9 | −3.42 |
| 2 | | 2.101(ASP) | 1.907 | | | | |
| 3 | Lens 2 | 10.922(ASP) | 3.895 | Glass | 1.847 | 23.8 | −88.93 |
| 4 | | 7.979(ASP) | 0.108 | | | | |
| 5 | Ape. Stop | Plano | 0.100 | | | | |
| 6 | Lens 3 | 37.736 | 1.557 | Glass | 1.516 | 64.1 | 6.98 |
| 7 | | −3.932 | 0.100 | | | | |
| 8 | Lens 4 | −78.125 | 2.527 | Glass | 1.729 | 54.7 | 7.13 |
| 9 | | −4.940 | 0.762 | | | | |
| 10 | Lens 5 | 16.905 | 0.692 | Glass | 1.847 | 23.8 | −6.23 |
| 11 | | 3.947 | 0.010 | cemented | | | |
| 12 | Lens 6 | 3.947 | 2.718 | Glass | 1.729 | 54.7 | 5.01 |
| 13 | | −34.505 | 1.200 | | | | |
| 14 | IR-cut filter | Plano | 0.300 | Glass | 1.517 | 64.2 | — |
| 15 | | Plano | 0.500 | | | | |
| 16 | cover glass | Plano | 0.550 | Glass | 1.517 | 64.2 | — |
| 17 | | Plano | 1.727 | | | | |
| 18 | image Mane | Plano | — | | | | |

Reference wavelength (d-line) is 587.6 nm
Lens 5 and Lens 6 are cemented

TABLE 9

Aspheric Coefficients

| Surface # | 1 | 2 | 3 | 4 |
|---|---|---|---|---|
| k = | 5.9878E+00 | −2.4518E−01 | −3.3545E+00 | 5.4478E+00 |
| A4 = | 3.4568E−04 | −1.7519E−03 | −3.6517E−04 | 2.2137E−03 |
| A6 = | −5.3386E−06 | 2.9530E−04 | 3.5571E−05 | −4.2844E−04 |
| A8 = | −1.9124E−07 | 2.0090E−06 | 1.3231E−05 | −3.0429E−04 |
| A10 = | 3.6428E−09 | −5.0397E−07 | −2.6401E−06 | 2.5803E−04 |

In Table 9, k represents the conic coefficient of the equation of the aspheric surface profiles according to the 6th embodiment, A1-A10 represent the aspheric coefficients ranging from the 1st order to the 10th order.

In the monofocal photographing lens assembly according to the 6th embodiment, the definitions of f, Fno, HFOV, N6, T23, T45, f1, f2, ΣCT, Td, SD11, SD62, Dr1s, Dsr12, and RI_0.8F are the same as those stated in the 1st embodiment with corresponding values for the 6th embodiment. Moreover, these parameters can be calculated from Table 8 and Table 9 as the following values and satisfy the following relationships:

| | |
|---|---|
| f (mm) | 2.66 |
| Fno | 2.40 |
| HFOV (deg.) | 72.8 |
| N6 | 1.729 |
| T45/T23 | 3.67 |
| f/f1 | −0.78 |
| f/f2 | −0.03 |
| Td/ΣCT | 1.23 |

-continued

| | |
|---|---|
| SD11/SD62 | 1.55 |
| Dr1s/Dsr12 | 0.86 |
| RI_0.8F (%) | 88.9 |

7th Embodiment

Figure 13:
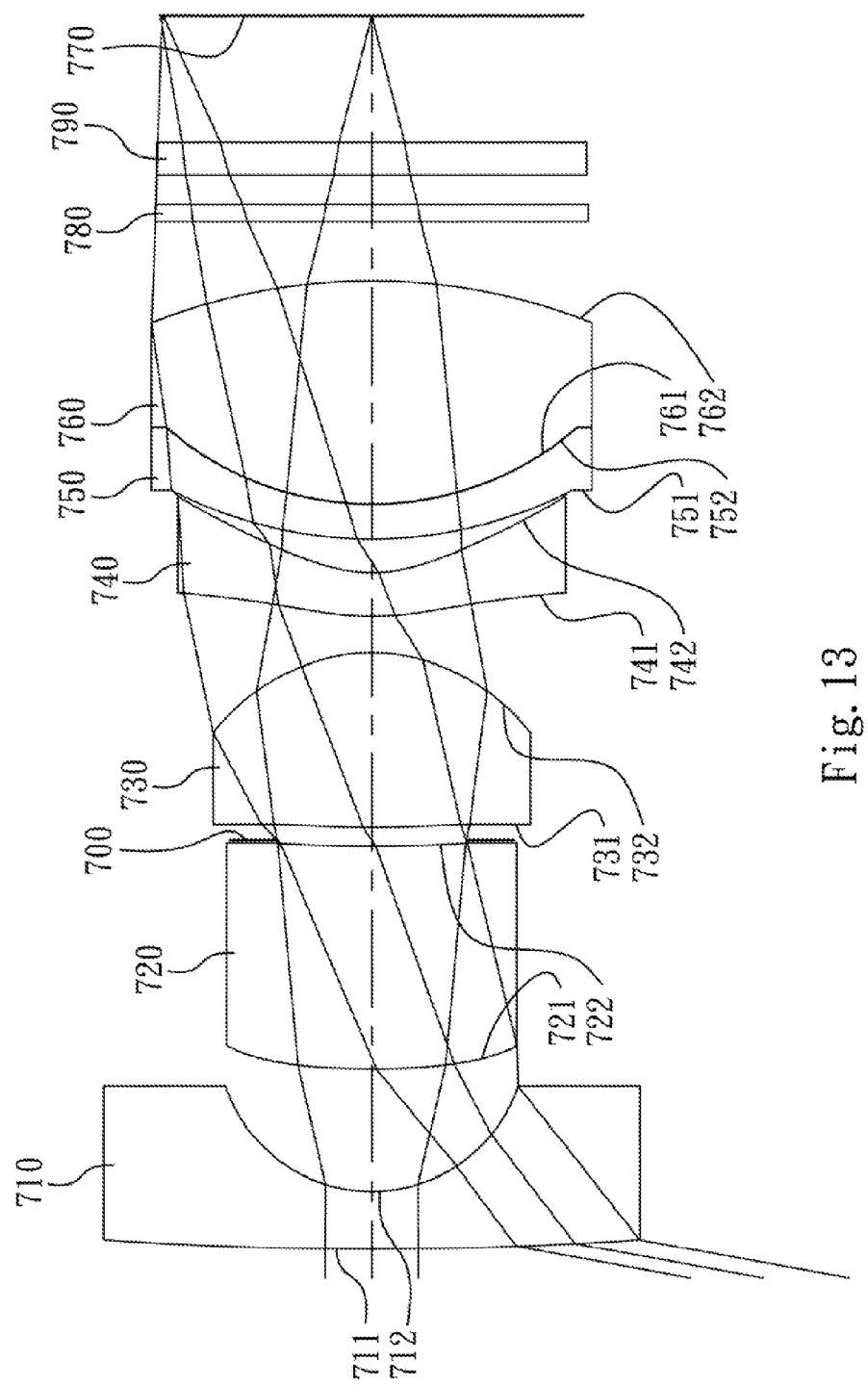
FIG. 13 is a schematic view of a monofocal photographing lens assembly according to the 7th embodiment of the present disclosure.
Figure 14:
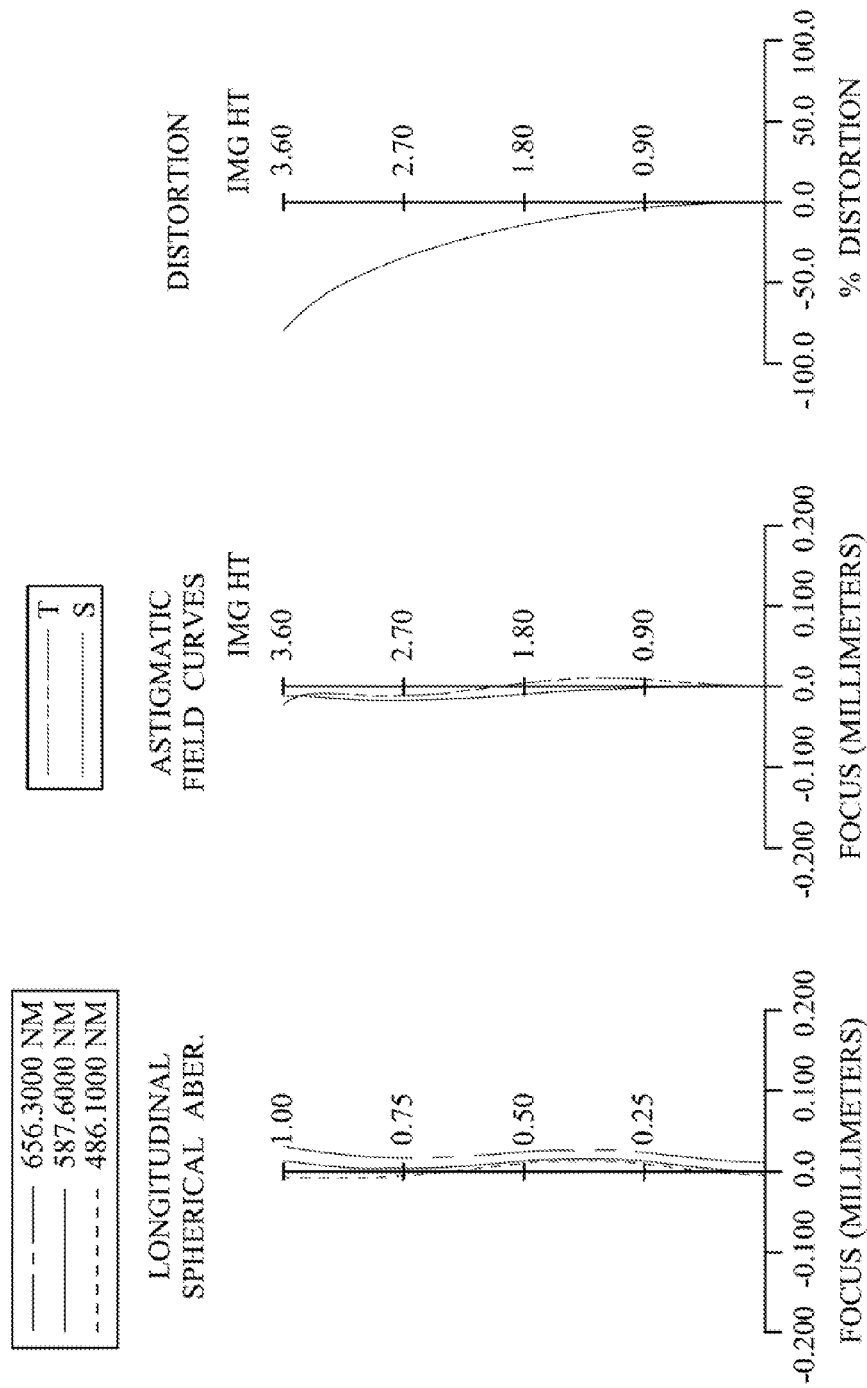
FIG. 14 shows spherical aberration curves, astigmatic field curves and a distortion curve of the monofocal photographing lens assembly according to the 7th embodiment.

FIG. 13 is a schematic view of a monofocal photographing lens assembly according to the 7th embodiment of the present disclosure. FIG. 14 shows spherical aberration curves, astigmatic field curves and a distortion curve of the monofocal photographing lens assembly according to the 7th embodiment. In FIG. 13, the monofocal photographing lens assembly includes, in order from an object side to an image side, a first lens element 710, a second lens element 720, an aperture stop 700, a third lens element 730, a fourth lens element 740, a fifth lens element 750, a sixth lens element 760, an IR-cut filter 780, a cover glass 790, and an image plane 770.

The first lens element 710 with negative refractive power made of glass material and has a convex object-side surface 711 and a concave image-side surface 712.

The second lens element 720 with positive refractive power made of plastic material and has a convex object-side surface 721 and a concave image-side surface 722, wherein the object-side surface 721 and the image-side surface 722 of the second lens element 720 are aspheric.

The third lens element 730 with positive refractive power made of plastic material and has a convex object-side surface 731 and a convex image-side surface 732, wherein the object-side surface 731 and the image-side surface 732 of the third lens element 730 are aspheric. An air space is formed between the second lens element 720 and the third lens element 730.

The fourth lens element 740 with negative refractive power made of plastic material and has a convex object-side surface 741 and a concave image-side surface 742, wherein the object-side surface 741 and the image-side surface 742 of the fourth lens element 740 are aspheric.

The fifth lens element 750 with negative refractive power made of glass material and has a convex object-side surface 751 and a concave image-side surface 752. An air space is formed between the fourth lens element 740 and the fifth lens element 750.

The sixth lens element 760 with positive refractive power made of glass material and has a convex object-side surface 761 and a convex image-side surface 762. The image-side surface 752 of the fifth lens element 750 is cemented with the object-side surface 761 of the sixth lens element 760.

The IR-cut filter 780 is made of glass material, wherein the IR-cut filter 780 and the cover glass 790 are sequentially located between the sixth lens element 760 and the image plane 770, and will not affect the focal, length of the monofocal photographing lens assembly.

The detailed optical data of the 7th embodiment are shown in Table 10 and the aspheric surface data are shown in Table 11 below.

TABLE 10

7th Embodiment
f = 3.17 mm, Fno = 2.00, HFOV = 79.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 66.716 | 0.979 | Glass | 1.713 | 53.9 | −3.86 |
| 2 | | 2.624 | 2.089 | | | | |
| 3 | Lens 2 | 12.726(ASP) | 3.800 | Plastic | 1.634 | 23.8 | 28.03 |
| 4 | | 39.635(ASP) | 0.098 | | | | |
| 5 | Ape. Stop | Plano | 0.224 | | | | |
| 6 | Lens 3 | 18.339(ASP) | 2.967 | Plastic | 1.535 | 56.3 | 5.12 |
| 7 | | −3.039(ASP) | 0.627 | | | | |
| 8 | Lens 4 | 4.683(ASP) | 0.745 | Plastic | 1.650 | 21.4 | −8.89 |
| 9 | | 2.424(ASP) | 0.562 | | | | |
| 10 | Lens 5 | 7.343 | 0.600 | Glass | 1.847 | 23.8 | −27.09 |
| 11 | | 5.354 | 0.010 | cemented | | | |
| 12 | Lens 6 | 5.354 | 3.800 | Glass | 1.729 | 54.7 | 5.37 |
| 13 | | −10.197 | 1.000 | | | | |
| 14 | IR-cert filter | Plano | 0.300 | Glass | 1.517 | 64.2 | — |
| 15 | | Plano | 0.500 | | | | |
| 16 | cover glass | Plano | 0.550 | Glass | 1.517 | 64.2 | — |
| 17 | | Plano | 2.156 | | | | |
| 18 | image plane | Plano | — | | | | |

Reference wavelength (d-line) is 587.6 nm
Lens 5 and Lens 6 are cemented

TABLE 11

Aspheric Coefficients

| Surface # | 3 | 4 | 6 | 7 | 8 | 9 |
|---|---|---|---|---|---|---|
| k = | 1.7000E+01 | 1.3000E+01 | −2.0670E+00 | −4.2227E−01 | −1.3605E+01 | −4.1153E+00 |
| A4 = | 4.0441E−04 | 2.7541E−03 | −1.2185E−03 | 3.7043E−03 | −3.3786E−03 | −1.5655E−04 |
| A6 = | 3.8426E−04 | −3.2480E−04 | −8.9445E−04 | −4.3759E−04 | 1.2189E−04 | 1.7091E−05 |
| A8 = | −8.6446E−05 | −1.9008E−05 | −1.0984E−05 | 1.2484E−05 | −4.4526E−06 | 5.4437E−06 |
| A10 = | 1.1512E−05 | 3.6849E−05 | 1.4234E−05 | −2.1700E−06 | 6.1548E−07 | −1.4187E−07 |
| A12 = | 9.0564E−22 | 9.0564E−22 | | | 7.9386E−21 | 7.9346E−21 |

In Table 11, k represents the conic coefficient of the equation of the aspheric surface profiles according to the 7th embodiment. A1-A12 represent the aspheric coefficients ranging from the 1st order to the 12th order.

In the monofocal photographing lens assembly according to the 7th embodiment, the definitions of f, Fno, HFOV, N6, T23, T45, f1, f2, ΣCT, Td, SD11, SD62, Dr1s, Dsr12, and $RI_{-0.8}F$ are the same as those stated in the 1st embodiment with corresponding values for the 7th embodiment. Moreover, these parameters can be calculated from Table 10 and Table 11 as the following values and satisfy the following relationships:

| | |
|---|---|
| f (mm) | 3.17 |
| Fno | 2.00 |
| HFOV (deg.) | 79.6 |
| N6 | 1.729 |
| T45/T23 | 1.74 |
| f/f1 | −0.82 |
| f/f2 | 0.11 |
| Td/ΣCT | 1.28 |
| SD11/SD62 | 1.22 |
| Dr1s/Dsr12 | 0.73 |
| RI_0.8F (%) | 87.1 |

8th Embodiment

Figure 15:
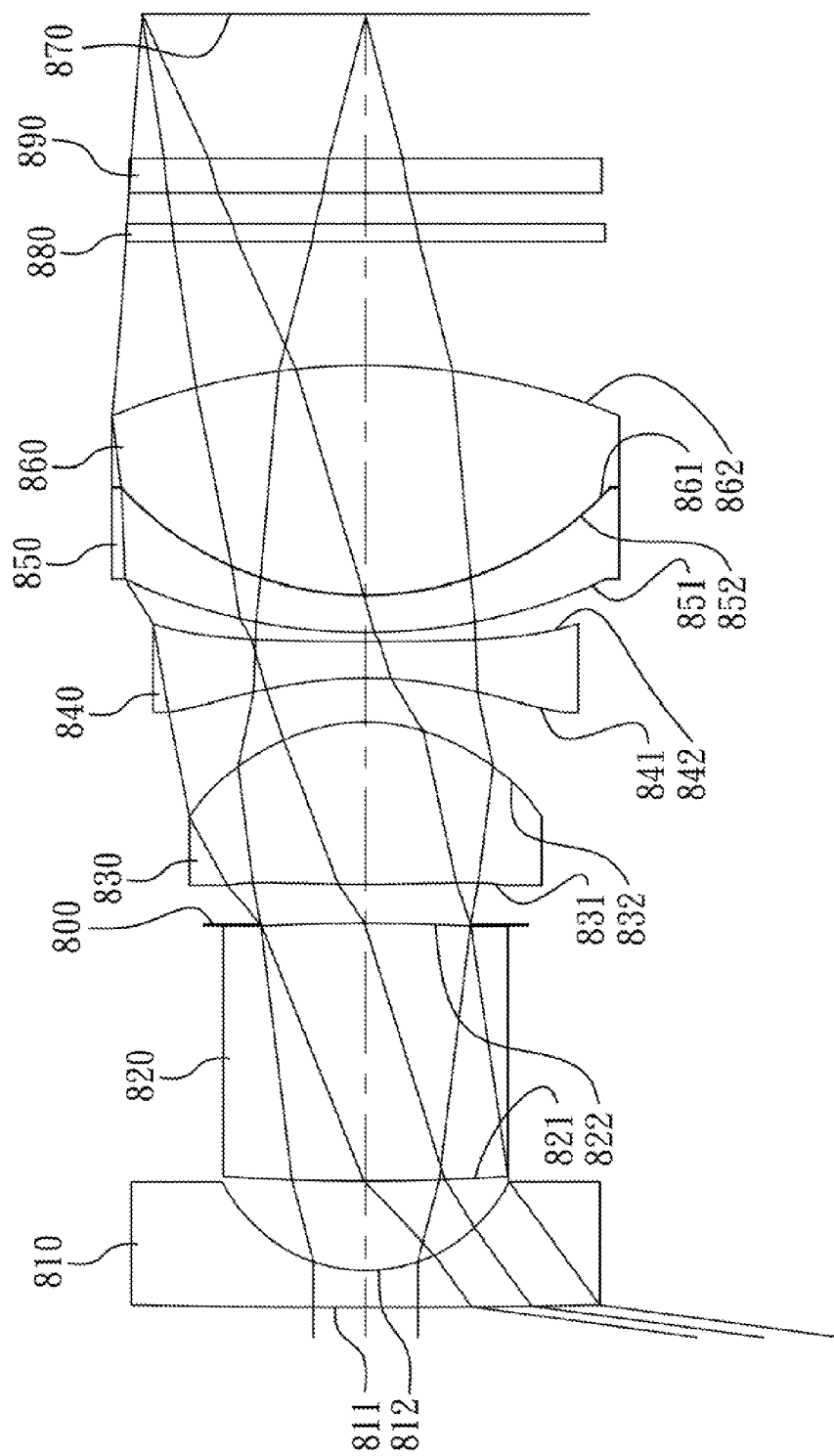
FIG. 15 is a schematic view of a monofocal photographing lens assembly according to the 8th embodiment of the present disclosure.
Figure 16:
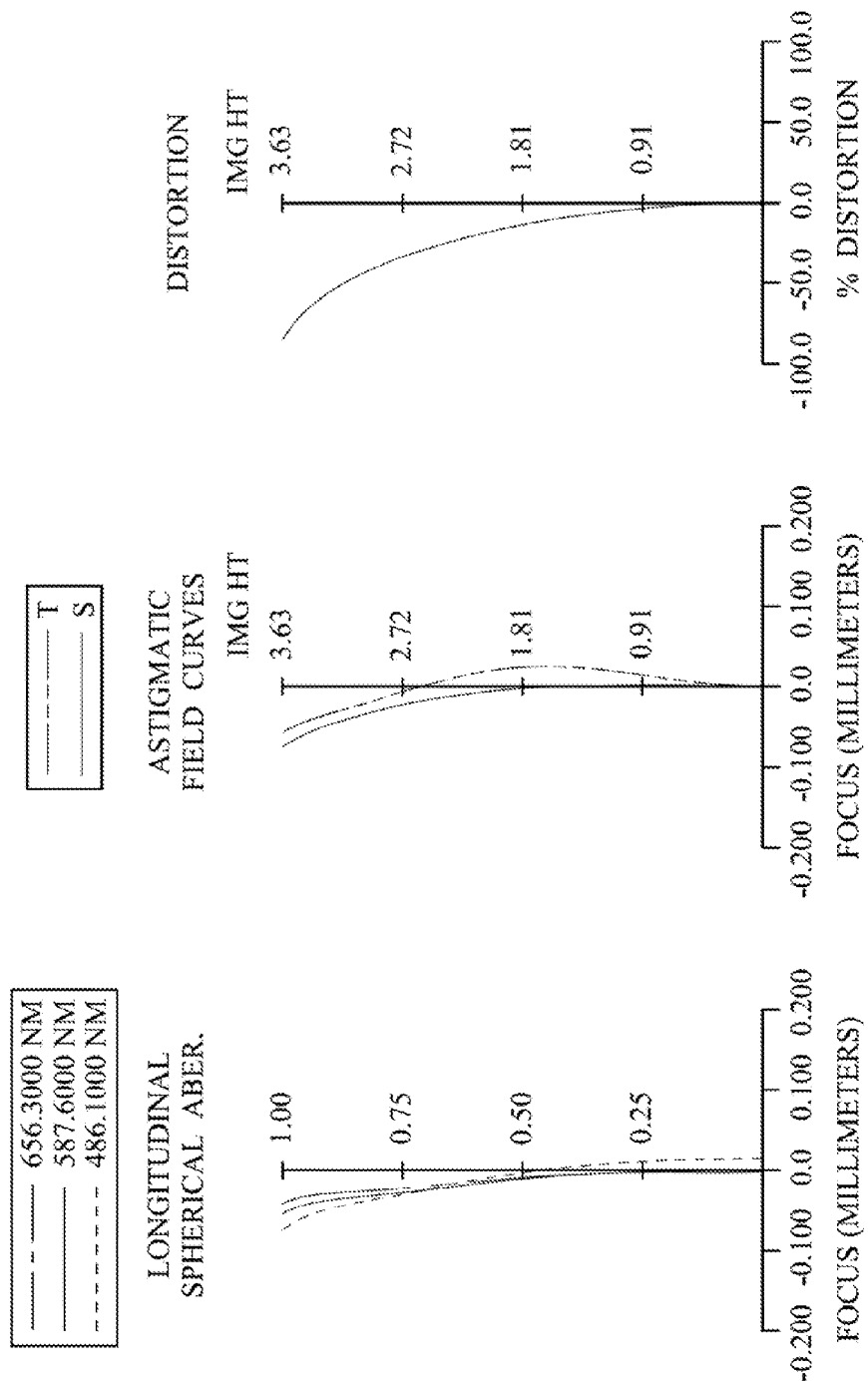
FIG. 16 shows spherical aberration curves, astigmatic field curves and a distortion curve of the monofocal photographing lens assembly according to the 8th Embodiment.

FIG. 15 is a schematic view of a monofocal photographing lens assembly according to the 8th embodiment of the present disclosure. FIG. 16 shows spherical aberration curves, astigmatic field curves and a distortion curve of the monofocal photographing lens assembly according to the 8th embodiment. In FIG. 15, the monofocal photographing lens assembly includes, in order from an object side to an image side, a first lens element 810, a second lens element 820, an aperture stop 800, a third lens element 830, a fourth lens element 840, a fifth lens element 850, a sixth lens element 860, an IR-cut filter 880, a cover glass 890, and an image plane 870.

The first lens element 810 with negative refractive power made of glass material and has a convex object-side surface 811 and a concave image-side surface 812.

The second lens element 820 with positive refractive power made of glass material and has a convex object-side surface 821 and a convex image-side surface 822.

The third lens element 830 with positive refractive power made of plastic material and has a convex object-side surface 831 and a convex image-side surface 832, wherein the object-side surface 831 and the image-side surface 832 of the third lens element 830 are aspheric. An air space is formed between the second lens element 820 and the third lens element 830.

The fourth lens element 840 with negative refractive power made of plastic material and has a concave object-side surface 841 and a concave image-side surface 842, wherein the object-side surface 841 and the image-side surface 842 of the fourth lens element 840 are aspheric.

The fifth lens element 850 with negative refractive power made of glass material and has a convex object-side surface 851 and a concave image-side surface 852. An air space is formed between the fourth lens element 840 and the fifth lens element 850.

The sixth lens element 860 with positive refractive power made of glass material and has a convex object-side surface 861 and a convex image-side surface 862. The image-side surface 852 of the fifth lens element 850 is cemented with the object-side surface 861 of the sixth lens element 860.

The IR-cut filter 880 is made of glass material, wherein the IR-cut filter 880 and the cover glass 890 are sequentially located between the sixth lens element 860 and the image plane 870, and will not affect the focal length of the monofocal photographing lens assembly.

The detailed optical data, of the 8th embodiment are shown in Table 12 and the aspheric surface data are shown in Table 13 below.

TABLE 12

8th Embodiment
f = 3.40 mm, Fno = 2.00, HFOV = 82.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 181.890 | 0.600 | Glass | 1.713 | 53.9 | −3.72 |
| 2 | | 2.607 | 1.453 | | | | |
| 3 | Lens 2 | 36.169 | 4.177 | Glass | 1.847 | 23.8 | 20.64 |
| 4 | | −32.020 | −0.025 | | | | |
| 5 | Ape. Stop | Plano | 0.668 | | | | |
| 6 | Lens 3 | 28.420(ASP) | 2.637 | Plastic | 1.535 | 56.3 | 5.17 |
| 7 | | −2.962(ASP) | 0.705 | | | | |
| 8 | Lens 4 | −6.566(ASP) | 0.600 | Plastic | 1.632 | 23.4 | −9.32 |
| 9 | | 5.232(ASP) | 0.150 | | | | |
| 10 | Lens 5 | 9.297 | 0.600 | Glass | 1.847 | 23.8 | −16.15 |
| 11 | | 5.371 | 0.010 | cemented | | | |
| 12 | Lens 6 | 5.371 | 3.726 | Glass | 1.726 | 53.6 | 5.46 |
| 13 | | −10.755 | 2.000 | | | | |
| 14 | IR-cut filter | Plano | 0.300 | Glass | 1.517 | 64.2 | — |
| 15 | | Plano | 0.500 | | | | |
| 16 | cover glass | Plano | 0.550 | Glass | 1.517 | 64.2 | — |
| 17 | | Plano | 2.350 | | | | |
| 18 | image plane | Plano | — | | | | |

Reference wavelength (d-line) is 587.6 nm
Lens 5 and Lens 6 are cemented

TABLE 13

| Aspheric Coefficients | | | | |
|---|---|---|---|---|
| Surface # | 6 | 7 | 8 | 9 |
| k = | 1.4801E+00 | −2.3515E−01 | −4.3642E+00 | 1.3000E+01 |
| A4 = | −1.6528E−03 | 5.4663E−03 | 1.1419E−03 | 3.5464E−04 |
| A6 = | −3.2524E−04 | −3.5934E−04 | −9.6267E−05 | 1.2971E−04 |
| A8 = | −1.3268E−05 | 3.6307E−05 | 7.8632E−06 | −5.2519E−06 |
| A10 = | −3.7685E−06 | −2.2834E−06 | 1.4270E−07 | 1.1258E−07 |
| A12 = | | | 9.7795E−21 | 9.7756E−21 |

In Table 13, k represents the conic coefficient of the equation of the aspheric surface profiles according to the 8th embodiment. A1-A12 represent the aspheric coefficients ranging from the 1st order to the 12th order.

In the monofocal photographing lens assembly according to the 8th embodiment, the definitions of f, Fno, HFOV, N6, T23, T45, f1, f2, ΣCT, Td, SD11, SD62, Dr1s, Dsr12, and RI_0.8F are the same as those stated in the 1st embodiment with corresponding values for the 8th embodiment. Moreover, these parameters can be calculated from Table 12 and Table 13 as the following values and satisfy the following relationships:

| | |
|---|---|
| f (mm) | 3.40 |
| Fno | 2.00 |
| HFOV (deg.) | 82.1 |
| N6 | 1.726 |
| T45/T23 | 0.23 |
| f/f1 | −0.91 |
| f/f2 | 0.16 |
| Td/ΣCT | 1.24 |
| SD11/SD62 | 0.92 |
| Dr1s/Dsr12 | 0.68 |
| RI_0.8F (%) | 95.6 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A monofocal photographing lens assembly comprising, in order from an object side to an image side:
   a first lens element with negative refractive power having a concave image-side surface;
   a second lens element with refractive power;
   a third lens element with refractive power;
   a fourth lens element with refractive power;
   a fifth lens element with negative refractive power; and
   a sixth lens element with positive refractive power having a convex image-side surface;
   wherein a sum of central thicknesses of the first through sixth lens elements is ΣCT, an axial distance between an object-side surface of the first lens element and the image-side surface of the sixth lens element is Td, a focal length of the monofocal photographing lens assembly is f, a focal length of the first lens element is f1, an f-number of the monofocal photographing lens assembly is Fno, and the following relationships are satisfied:

$1.0 < Td/\Sigma CT < 1.35$;

$-1.5 < f/f1 < -0.6$, and $1.5 < Fno < 3.0$.

2. The monofocal photographing lens assembly of claim 1, wherein the sixth lens element has a convex object-side surface.

3. The monofocal photographing lens assembly of claim 2, wherein the focal length of the monofocal photographing lens assembly is f, a focal length of the second lens element is f2, and the following relationship is satisfied:

$-0.5 < f/f2 < 0.5$.

4. The monofocal photographing lens assembly of claim 3, wherein the third lens element has a convex image-side surface, an air space is formed between the second lens element and the third lens element, and another air space is formed between the fourth lens element and the fifth lens element.

5. The monofocal photographing lens assembly of claim 4, wherein the third lens element has positive refractive power, the fifth lens element has a concave image-side surface which is cemented with the object-side surface of the sixth lens element.

6. The monofocal photographing lens assembly of claim 4, wherein a half of a maximal field of view of the monofocal photographing lens assembly is HFOV, and the following relationship is satisfied:

70 degrees < $HFOV$ < 100 degrees.

7. The monofocal photographing lens assembly of claim 4, wherein a relative illumination at an 80% position of a maximal image height on an image plane of the monofocal photographing lens assembly is RI_0.8F, and the following relationship is satisfied:

70% < RI_0.8F.

8. The monofocal photographing lens assembly of claim 4, wherein the second lens element has a convex object-side surface, the focal length of the monofocal photographing lens assembly is f, the focal length of the first lens element f1, and the following relationship is satisfied:

$-1.2 < f/f1 < -0.75$.

9. The monofocal photographing lens assembly of claim 4, wherein an effective radius of the object-side surface of the first lens element is SD11 an effective radius of the image-side surface of the sixth lens element is SD62, and the following relationship is satisfied:

$0.8 < SD11/SD62 < 1.3$.

10. The monofocal photographing lens assembly of claim 2, wherein the sum of central thicknesses of the first through sixth lens elements is ΣCT, the axial distance between the object-side surface of the first lens element and the image-side surface of the sixth lens element is Td, and the following relationship is satisfied:

$1.0<Td/\Sigma CT<1.25$.

11. The monofocal photographing lens assembly of claim 10, wherein the f-number of the monofocal photographing lens assembly is Fno, and the following relationship is satisfied:

$1.8<Fno<2.5$.

12. The monofocal photographing lens assembly of claim 10, further comprising:
a stop located between the second lens element and the third lens element, wherein an axial distance between the object-side surface of the first lens element and the stop is Dr1s, an axial distance between the stop and the image-side surface of the sixth lens element is Dsr12, and the following relationship is satisfied:

$0.4<Dr1s/Dsr12<1.0$.

13. The monofocal photographing lens assembly of claim 10, wherein the focal length of the monofocal photographing lens assembly is f, a focal length of the second lens element is f2, and the following relationship is satisfied:

$-0.3<f/f2<0.3$.

14. The monofocal photographing lens assembly of claim 10, wherein the focal length of the monofocal photographing lens assembly is f, the focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and the following relationships are satisfied:

$|f/f1|>|f/f2|$, $|f/f1|>|f/f3|$, $|f/f1|>|f/f4|$, $|f/f1|>|f/f5|$, and $|f/f1|>|f/f6|$.

15. A monofocal photographing lens assembly comprising, in order from an object side to an image side:
a front lens group, comprising in order form an object side to an image side:
a first lens element with negative refractive power having a concave image-side surface; and
a second lens element with refractive power;
a stop; and
a rear lens group, comprising in order from an object side to an image side:
a third lens element with refractive power having a convex image-side surface;
a fourth lens element with refractive power;
a fifth lens element with negative refractive power; and
a sixth lens element with positive refractive power having a convex image-side surface;
wherein a sum of central thicknesses of the first through sixth lens elements is ΣCT, an axial distance between an object-side surface of the first lens element and the image-side surface of the sixth lens element is Td, a focal length of the monofocal photographing lens assembly is f, a focal length of the first lens element is f1, and the following relationships are satisfied:

$1.0<Td/\Sigma CT<1.35$; and $-1.5<f/f1<-0.6$.

16. The monofocal photographing lens assembly of claim 15, wherein an axial distance between the object-side surface of the first lens element and the stop is Dr1s, an axial distance between the stop and the image-side surface of the sixth lens element is Dsr12, and the following relationship is satisfied:

$0.4<Dr1s/Dsr12<1.0$.

17. The monofocal photographing lens assembly of claim 16, wherein an axial distance between the second lens element and the third lens element is T23, an axial distance between the fourth lens element and the fifth lens element is T45, and the following relationship is satisfied:

$0.1<T45/T23<5$.

18. The monofocal photographing lens assembly of claim 17, wherein an image-side surface of the fifth lens element is cemented with an object-side surface of the sixth lens element, the focal length of the monofocal photographing lens assembly is f, the focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and the following relationships are satisfied:

$|f/f1|>|f/f2|$, $|f/f1|>|f/f3|$, $|f/f1|>|f/f4|$, $|f/f1|>|f/f5|$, and $|f/f1|>|f/f6|$.

19. The monofocal photographing lens assembly of claim 17, wherein the second lens element has a convex object-side surface, the fourth lens element has a convex object-side surface and a convex image-side surface, the focal length of the monofocal photographing lens assembly is f, a focal length of the second lens element is f2, and the following relationship is satisfied:

$-0.3<f/f2<0.3$.

20. The monofocal photographing lens assembly of claim 15, wherein the third lens element has positive refractive power, an f-number of the monofocal photographing lens assembly is Fno, and the following relationship is satisfied:

$1.8<Fno<2.5$.

21. The monofocal photographing lens assembly of claim 20, wherein the fifth fens element has a concave image-side surface, a refractive index of the sixth lens element is N6, and the following relationship is satisfied:

$N6>1.7$.

22. The monofocal photographing lens assembly of claim 15, wherein the sum of central thicknesses of the first through sixth lens elements is ΣCT, the axial distance between the object-side surface of the first lens element and the image-side surface of the sixth lens element is Td, and the following relationship is satisfied:

$1.0<Td/\Sigma CT<1.25$.

23. The monofocal photographing lens assembly of claim 16, wherein the effective radius of the object-side surface of the first lens element is SD11, the effective radius of the image-side surface of the sixth lens element is SD62, and the following relationship is satisfied:

$$0.8 < SD11/SD62 < 1.3.$$

24. The monofocal photographing lens assembly of claim 16, wherein a relative illumination at an 80% position of a maximal image height on an image plane of the monofocal photographing lens assembly is RI_0.8F, and the following relationship is satisfied:

$$70\% < RI\_0.8F.$$

25. The monofocal photographing lens assembly of claim 16, wherein a half of a maximal field of view of the monofocal photographing lens assembly is HFOV, and the following relationship is satisfied:

$$70 \text{ degrees} < HFOV < 100 \text{ degrees}.$$

* * * * *